United States Patent
Gotou et al.

(10) Patent No.: US 9,062,217 B2
(45) Date of Patent: *Jun. 23, 2015

(54) LIQUID COMPOSITION, RECORDING METHOD, AND RECORDED MATTER

(75) Inventors: Hiroshi Gotou, Kanagawa (JP);
Hidetoshi Fujii, Kanagawa (JP);
Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/703,685

(22) PCT Filed: Jun. 15, 2011

(86) PCT No.: PCT/JP2011/064189
§ 371 (c)(1),
(2), (4) Date: Dec. 12, 2012

(87) PCT Pub. No.: WO2012/002198
PCT Pub. Date: Jan. 5, 2012

(65) Prior Publication Data
US 2013/0101814 A1    Apr. 25, 2013

(30) Foreign Application Priority Data
Jun. 29, 2010  (JP) .................................. 2010-147592

(51) Int. Cl.
*C08K 5/19* (2006.01)
*C09D 7/12* (2006.01)
*B41M 5/00* (2006.01)
(Continued)

(52) U.S. Cl.
CPC .............. *C09D 7/1233* (2013.01); *C08K 5/175* (2013.01); *C08F 26/04* (2013.01); *C08K 5/19* (2013.01); *C09D 11/106* (2013.01); *Y10T 428/24901* (2015.01); *B41M 5/0017* (2013.01); *C09D 11/322* (2013.01); *C09D 11/40* (2013.01); *C09D 11/54* (2013.01); *B05D 5/04* (2013.01)

(58) Field of Classification Search
USPC .......... 427/322, 444, 466; 524/300, 381, 386, 524/388
See application file for complete search history.

(56) References Cited

U.S. PATENT DOCUMENTS 7,033,013 B2    4/2006  Koyano et al.
2002/0029722 A1 *  3/2002  Shioya et al. ............... 106/31.43
(Continued)

FOREIGN PATENT DOCUMENTS

CN    1839050    9/2006
JP    2002-103583    4/2002
(Continued)

OTHER PUBLICATIONS

The Extended European Search Report issued Feb. 26, 2013, in Application No. / Patent No. 11800663.4-1701 PCT/JP2011064189.
(Continued)

*Primary Examiner* — Richard A Huhn
(74) *Attorney, Agent, or Firm* — Oblon, McClelland, Maier & Neustadt, L.L.P.

(57) ABSTRACT

A liquid composition for agglutinating particles having a negative charge which are dispersed in a dispersion liquid, the liquid composition including: an organic acid ammonium salt represented by Formula (1), and water, Formula (1) where $R_1$ represents a hydroxyl group, a methyl group or a hydrogen atom; and $R_2$ represents a hydroxyl group or a methyl group.

18 Claims, 2 Drawing Sheets

(51) Int. Cl.
  *C09D 11/322* (2014.01)
  *C09D 11/40* (2014.01)
  *C09D 11/54* (2014.01)
  *B05D 5/04* (2006.01)
  *C08K 5/17* (2006.01)
  *C08F 26/04* (2006.01)
  *C09D 11/106* (2014.01)

(56) References Cited

U.S. PATENT DOCUMENTS

| | | | | |
|---|---|---|---|---|
| 2003/0144365 | A1* | 7/2003 | Schwartz et al. | 516/132 |
| 2005/0005817 | A1* | 1/2005 | Kusakata et al. | 106/31.27 |
| 2008/0248260 | A1 | 10/2008 | Kojima et al. | |
| 2010/0253734 | A1* | 10/2010 | Ikeda et al. | 347/21 |
| 2011/0318543 | A1* | 12/2011 | Goto | 428/195.1 |
| 2012/0320137 | A1* | 12/2012 | Fujii et al. | 347/100 |

FOREIGN PATENT DOCUMENTS

| | | | | |
|---|---|---|---|---|
| JP | 2002096453 A * | 4/2002 | | B41J 2/01 |
| JP | 2003-205605 | 7/2003 | | |
| JP | 2003276314 A * | 9/2003 | | B41M 5/00 |
| JP | 2004-142291 | 5/2004 | | |
| JP | 2004-330569 | 11/2004 | | |
| JP | 2007276387 A * | 10/2007 | | B41M 5/00 |
| JP | 2008-260307 | 10/2008 | | |
| JP | 2009166387 A * | 7/2009 | | B41M 5/00 |
| WO | 2009/091079 A1 | 7/2009 | | |
| WO | WO 2011/105613 A1 | 9/2011 | | |

OTHER PUBLICATIONS

Office Action as received in the corresponding Chinese Patent Application No. 201180032638.8 dated Nov. 7, 2013 w/English Translation.

* cited by examiner

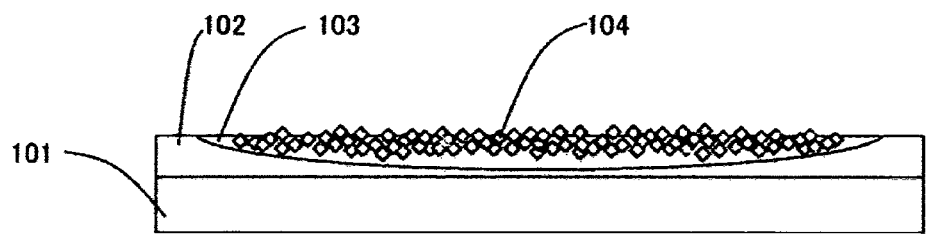
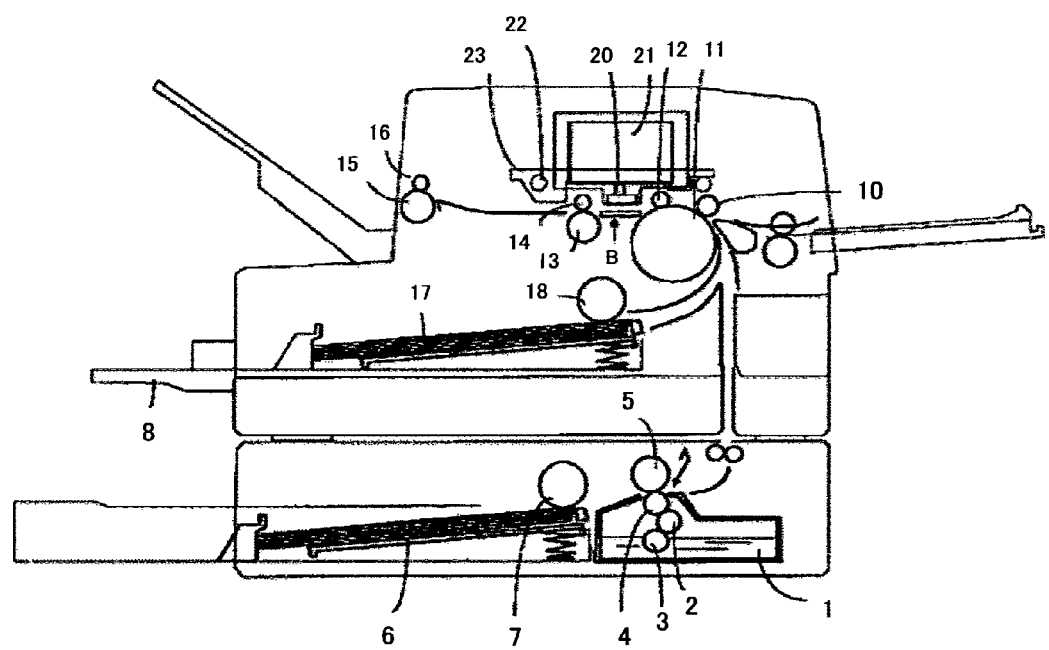

LIQUID COMPOSITION, RECORDING METHOD, AND RECORDED MATTER

This application is a National Stage of PCT/JP11/064189 filed Jun. 15, 2011 and claims the benefit of JP 2010-147592 filed Jun. 29, 2010.

TECHNICAL FIELD

The present invention relates to a liquid composition for making particles which are dispersed in a dispersion liquid and have a negative charge on surfaces thereof agglutinate.

BACKGROUND ART

In recent years, in accordance with demands for recording a color image at cheap cost, inkjet recording methods, in which a plurality of different color inks are provided to recording medium (referred to as "recording medium" hereinbelow) having no coating layer, such as regular paper, to thereby record an image on the recording medium, are used. In this case, since the inks are provided to the recording medium having no coating layer, the inks are directly absorbed into paper serving as the base of the recording medium, and thus degradation in quality of the recording medium (referred to as "recorded matter" hereinbelow) which is recorded by ink bleeding easily occur.

Then, it can be considered that an image is recorded using an ink having low permeability to prevent the ink from penetrating through the recording medium and to thereby prevent bleeding (referred to as "feathering" hereinbelow) at a boundary portion between the recording medium and the ink in the recorded matter. However, in this case, the ink easily retains on a surface of the recording medium, and accordingly, the drying properties of the recorded matter degrade. When the drying properties of a recorded matter degrade, a finger or the like comes into contact with an ink that has not yet been dried to cause smear on images, and in the case where a color image is recorded, a different color ink is attached to the ink that has not yet been dried, and bleeding (referred to as "color bleeding" hereinbelow) occurs at a boundary portion between these inks. Meanwhile, when an ink having high permeability is used to prevent the occurrence of color bleeding, there is a problem that the above-noted feathering occurs and the quality of a resulting recorded matter degrades.

To simultaneously solve these problems, there has been proposed a recording method using an ink and a liquid composition for fixing the ink on a recording medium. For example, there has been proposed an inkjet recording method in which a reaction liquid containing polyallylamine and an ink composition which contains a colorant and a resin emulsion is made adhere to a surface of a recording medium to thereby perform recording (see PTL 1 describes that according to this method, print bleeding and printing nonuniformity can be reduced on a recording medium and further, color bleeding can be effectively prevented. However, this proposal has a problem in terms of fixability of the ink composition on a recording medium. In other words, when the ink composition is made to adhere to a surface of the recording medium on which the liquid composition has been made to adhere, the pigment and the resin emulsion contained in the ink come into contact with polyallylamine which is positively charged, and rapidly agglutinate, and thus aggregates containing a small amount of vehicle (which means a liquid component in the reaction liquid or the ink composition) are accumulated on the outermost surface layer of the recording medium. The accumulated layer is weak in resistance to abrasion (referred to as "abrasion resistance" hereinbelow", and therefore, such a problem occurs that the rear surface of the recorded matter may be smeared with user's hand or ink. In addition, after an image recorded by this inkjet recording method was analyzed, it was found that the diameter of dots recorded was small. This can be considered due to a strong effect of the reaction liquid which causes the ink to agglutinate. When the diameter of dots is excessively small, there is a problem that white streaks (which means portions where no ink adheres) occur.

To solve the problem with abrasion resistance, there has been proposed an inkjet recording method in which an ink and a liquid composition containing specific polymer fine particles are made to adhere to a surface of a recording medium to thereby perform recording (see PTL 2). This proposal describes that it is possible to improve the abrasion resistance of recorded portions, because polymer fine particles contained in the liquid composition covers pixels of the ink.

CITATION LIST

Patent Literature

PTL 1 Japanese Patent (JP-B) No. 3206797
PTL 2 International Patent Publication No. 00/06390

SUMMARY OF INVENTION

Technical Problem

However, the proposal using polymer fine particles has a problem in terms of stability of the liquid composition. In other words, to fix an ink by polymer fine particles, a large amount of polymer fine particles are required. There is a problem in that a liquid composition containing a large amount of polymer fine particles, however, easily increased in viscosity, and in accordance with an increase in viscosity, the discharge stability and storage stability of the liquid composition degrade.

The present invention aims to solve the above-mentioned conventional problems and to achieve the following object. That is, the present invention aims to provide a liquid composition which can prevent occurrence of feathering, color bleeding, white spots and strikethrough and has excellent fixability, abrasion resistance and drying properties, a recording method using the liquid composition and a recorded matter obtained by the recording method.

Solution to Problem

Means for solving the above-mentioned problems are as follows:

<1> A liquid composition for agglutinating particles having a negative charge which are dispersed in a dispersion liquid, the liquid composition including;
an organic acid ammonium salt represented by Formula (1), and
water,

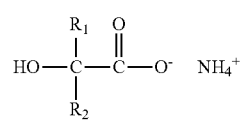

Formula (1)

where $R_1$ represents a hydroxyl group, a methyl group or a hydrogen atom; and $R_2$ represents a hydroxyl group or a methyl group.

<2> The liquid composition according to <1>, wherein the organic acid ammonium salt is ammonium lactate.

<3> The liquid composition according to one of <1> and <2>, further including:
a water-soluble polymer having a cationic functional group.

<4> The liquid composition according to <3>, wherein the water-soluble polymer having a cationic functional group is a polyamine derivative or a polyamide derivative.

<5> The liquid composition according to any one of <1> to <4>, wherein the liquid composition has a surface tension of 30 mN/m or lower.

<6> The liquid composition according to any one of <1> to <5>, further comprising:
a fluorine-based surfactant, and
a compound represented by Formula (2),

$$HOR_1R_3C-[CH_2]_n-CR_2R_4OH \quad \text{Formula (2)}$$

where $R_1$ and $R_2$ each independently represent an alkyl group having 3 to 6 carbon atoms; $R_3$ and $R_4$ each independently represent an alkyl group having 1 to 2 carbon atoms; and n is an integer of 1 to 6.

<7> A recording method including:
making the liquid composition according to any one of <1> to <6> adhere onto a recording medium, and
making an ink adhere onto the recording medium onto which the liquid composition has been made to adhere,
wherein the ink is a dispersion liquid in which particles containing a colorant and having a negative charge is dispersed in water.

<8> The recording method according to <7>, wherein the colorant is at least one selected from the group consisting of a self-dispersible pigment, a pigment coated with a resin, and a pigment dispersed by a dispersant.

<9> A recorded matter including:
an image,
wherein the image is recorded by the recording method according to one of <7> and <8>.

Advantageous Effects of Invention

When an ink is made to adhere onto a recording medium to which a liquid composition of the present invention adheres, a vehicle contained in the ink is rapidly diffused by the effect of an organic acid ammonium salt contained in the liquid composition, and at the same time, a colorant contained therein agglutinates. With the occurrence of diffusion of the vehicle and agglutination of the colorant, the colorant is fixed at a shallow portion inside the recording medium, and thus it is possible to prevent occurrence of feathering and color bleeding and to obtain an excellently fixed recorded matter.

According to the present invention, it is possible to solve the above-mentioned conventional problems and achieve the object described above. More specifically, the present invention can provide a liquid composition which can prevent occurrence of feathering, color bleeding, white spots and strikethrough and has excellent fixability, abrasion resistance and drying properties, a recording method using the liquid composition, and a recorded matter obtained by the recording method.

BRIEF DESCRIPTION OF DRAWINGS

FIG. 1 is a schematic cross-sectional view illustrating a state of a recorded portion in a recorded matter according to the present embodiment.

FIG. 2 is a cross-sectional side view illustrating one example of an apparatus for use in a recording method according to the present embodiment.

DESCRIPTION OF EMBODIMENTS (Liquid Composition)

Figure 3:
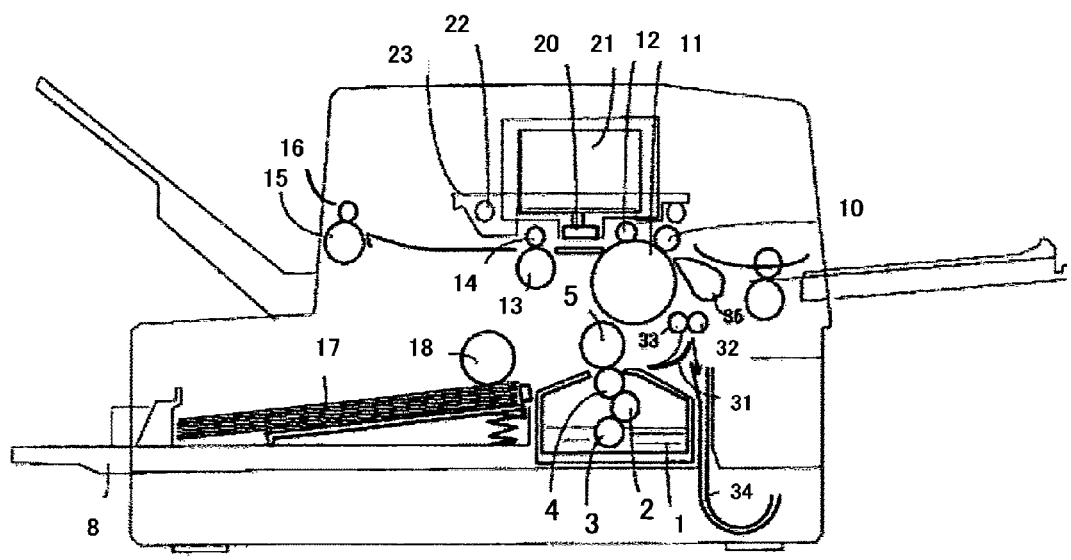
FIG. 3 is a cross-sectional side view illustrating another example of the apparatus for use in a recording method according to the present invention.

A liquid composition according to the present invention is a liquid composition for agglutinating particles having a negative charge in a dispersion liquid in which the particles are dispersed, and contains an organic acid ammonium salt, and water, preferably further contains a water-soluble polymer having a cationic functional group, and as required, further contains other components.

Here, as for the "dispersion liquid in which particles having a negative charge are dispersed", for example, there may be preferably exemplified an ink which is a dispersion liquid in which particles containing a colorant and having a negative charge on their surfaces are dispersed.

Hereinafter, with reference to preferred embodiments, the liquid composition of the present embodiments will be further described in detail. The liquid composition of the present embodiment contains a predetermined organic aid ammonium salt and water, and thereby the particles containing a colorant, which is to be dispersed in an ink, and having a negative charge on their surfaces are made to agglutinate. An expected mechanism of fixation of the ink using the liquid composition of the present invention is described using a schematic cross-sectional view for describing a stage of a recorded portion of a recorded matter of the present embodiment illustrated in FIG. 1. The liquid composition of the present invention contains a lactic acid ion formed by dissolving lactic acid ammonium in water, and an ammonium ion, and the like. When the liquid composition is applied to a recording medium 101 made of a paper body, a liquid composition-attached portion 102 is formed on the recording medium 101. In the case where an ink containing a colorant and having a negative charge on its surface is applied onto the liquid composition-attached portion 102, a lactic acid ion and a weak acid ammonium ion, which are weak base chelates and contained in the liquid composition-attached portion 102, act so that the concentration of hydrogen ions and metal ions contained in the ink do not greatly vary (buffering action). For this reason, the colorant contained in the ink sharply agglutinates (acid precipitation) due to an acid/base reaction, and the colorant in a large amount is prevented from precipitating on the recording medium. As a result of this, a vehicle diffuses in a direction of the surface or inside of the recording medium, the area of dots recorded is increased, and thereby the density of an image (which includes characters, symbols etc.) is increased. Subsequently, when an ink 103 penetrates into the liquid composition-attached portion 102 of the recording medium 101, a colorant 104 contained in the ink 103 loses its dispersibility by the action of a lactic acid ammonium salt (including ions formed) contained in the liquid composition-attached portion 102 to agglutinate (salting-out). The colorant 104 is fixed at a shallow position inside the recording medium in this way, thereby the fixability is improved, and the occurrence of feathering and color bleeding is reduced.

It is desired that the liquid composition of the present embodiment be quickly absorbed into a recording medium after being applied to the recording medium, and be in a dried state in appearance. In order to accomplish the objective, the surface tension of the liquid composition is preferably 30 mN/m or lower. Note that it is enough for the liquid composition to in a dried state in appearance, and there is no need that a liquid such as water be vaporized to be unable to keep the liquid state (in the present invention, this state is referred to as "solidification"). When the liquid composition penetrates into a recording medium and is in a dried state in appearance and even when the liquid composition is not solidified, it is possible to fix the ink and to improve the quality of an image to be recorded. Next, individual components contained the liquid composition of the present embodiment will be described hereinbelow.

<Organic Ammonium Salt>

As an organic ammonium salt for use in the liquid composition of the present invention, an organic ammonium salt represented by Formula (1) is used for the reasons of solubility to water, balance of the extent of acidity or basicity of individual ions dissociated, ease of forming chelates, etc. The number of carbon atoms of the organic ammonium salt is not particularly limited, however, from the viewpoint of solubility to water, it is preferably 6 per molecule or less. The organic ammonium salt is not particularly limited and may be suitably selected in accordance with the intended use. It is, however, preferably a lactic acid ammonium salt. The addition amount of the organic ammonium salt is preferably 1% by mass to 40% by mass, and more preferably 3% by mass to 30% by mass, relative to the total amount of the liquid composition. When the addition amount is more than 40% by mass, the effect of improving the quality of a recorded image in commensurate with the increased addition amount may not change, and the viscosity of the liquid composition may increase. When the addition amount is less than 1% by mass, there is a potential that the effect of improving the quality of an image is reduced.

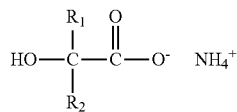

Formula (1)

In Formula (1), $R_1$ represents a hydroxyl group, a methyl group or a hydrogen atom; and $R_2$ represents a hydroxyl group or a methyl group.

<Water-soluble Polymer Having Cationic Functional Group>

A water-soluble polymer having a cationic functional group for use in the liquid composition of the present invention is not particularly limited. Examples thereof include water-soluble cationic polymers such as a polyallylamine derivative, a polydiallylamine derivative, and a polyamide derivative. Specific examples of the water-soluble cationic polymer include polymers containing a structural unit of N,N-dialkylallylamine represented by Formula (C-1) or addition salts thereof; polymers containing a structural unit of a N-substituted or unsubstituted diallylamine represented by Formula (C-2) or Formula (C-3) or addition salts thereof; and copolymers containing a repeating unit represented by (C-1) and a structural unit represented by Formula (C-2) or Formula (C-3) or addition salts thereof.

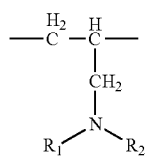

Formula (C-1)

In Formula (C-1), $R_1$ and $R_2$ each independently represent an alkyl group having 1 to 4 carbon atoms.

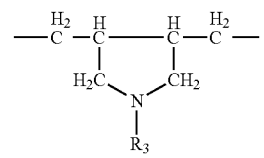

Formula (C-2)

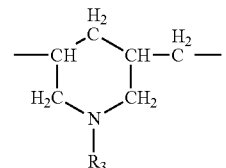

Formula (C-3)

In Formulae (C-2) and (C-3), $R_3$ represents a hydrogen atom or an alkyl group that may have 1 to 3 carbon atoms.

Among the copolymers, preferred is a copolymer which is obtained by copolymerizing a N-substituted or unsubstituted diallylamine represented by Formula (C-2) or Formula (C-3) with N,N-dialkylallylamine represented by Formula (C-1) in an equimolar ratio or less. In addition, in the water-soluble polymer having a cationic functional group (here, including the copolymer), the N,N-dialkylallylamine and the N-substituted or unsubstituted diallylamine may each be individually used alone or in combination of two or more. The weight average molecular weight of the water-soluble polymer having a cationic functional group is preferably 250 to 3,000 in a free state. The ignition residue of the water-soluble polymer having a cationic functional group is 5% by mass or less, preferably 2% by mass or less, and more preferably 0.5% by mass. Especially, the water-soluble cationic polymer is preferably a copolymer of N,N-dialkylallylamine and a N-substituted or unsubstituted diallylamine having a residual monomer amount of 250 mass ppm or lower or addition salts thereof.

Other specific examples of the water-soluble cationic polymer include an addition salt of a polymer containing a structural unit of N,N-dialklallylamine represented by Formula (C-4) or Formula (C-5); and a copolymer containing a structural unit represented by Formula (C-4) or Formula (C-5) and a structural unit of polyamide represented by Formula (C-6) or a structural unit of polyallylamine represented by Formula (C-7). The copolymer preferably has a molar ratio of the structural unit of N,N-dialklallylamine represented by Formula (C-4) or Formula (C-5) to the structural unit of polyamide represented by Formula (C-6) or the structural unit of polyallylamine represented by Formula (C-7) of from 95:5 to 50:50 and a weight average molecular weight of 2,000 to 15,000.

Formula (C-4)

Formula (C-5)

In Formulae (C-4) and (C-5), $R_4$ and $R_5$ may be identical to or different from each other, and each represent an alkyl group having 1 to 4 carbon atoms; and X⁻ represents a counter ion selected from Cl⁻, Br⁻, and I⁻.

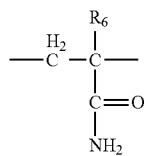

Formula (C-6)

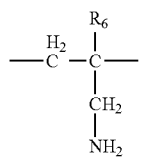

Formula (C-7)

In Formulae (C-6) and (C-7), $R_6$ represents a hydrogen atom or a methyl group.

Preferred example of other water-soluble cationic polymers include an addition salt of a polymer containing a structural unit of N,N-dialkylallylamine having an $SO_2$ group, which is represented by Formula (C-8). The weight average molecular weight of the polymer is preferably 2,000 to 30,000.

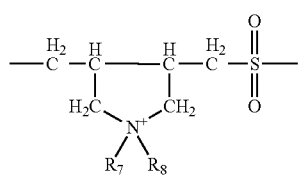

Formula (C-8)

In Formula (C-8), $R_7$ and $R_8$ may be identical to or different from each other, and each represent an alkyl group having 1 to 4 carbon atoms; X⁻ represents a counter ion selected from Cl⁻, Br⁻, and I⁻.

Further, as the water-soluble cationic polymer, a quaternary ammonium salt type cationic polymer, a water-dispersible cationic polymer and the like are suitably used. The addition amount of the water-soluble cationic polymer is preferably 1% by mass to 40% by mass of the liquid composition according to the present invention, and more preferably 3% by mass to 30% by mass. When the addition amount is more than 40% by mass, not only the effect of improving the quality of a recorded image is reduced in commensurate with the increased addition amount but also the viscosity of the liquid composition may increase. When the addition amount is less than 1% by mass, there is a probability that the effect of improving the quality of a recorded image is reduced.

<Water-soluble Organic Solvent>

The water-soluble organic solvent for use in the liquid composition according to the present invention is used for retaining water contained in the liquid composition.

With use of the water-soluble organic solvent, an increase in viscosity of the liquid composition can be suppressed and the discharge stability can be maintained, even when the liquid composition dries in a nozzle for providing thereof or in a coater to reach a state of equilibrium water content. For this reason, as the water-soluble organic solvent, it is preferable to use a water-soluble organic solvent having high-equilibrium water content. Here, the equilibrium water content means a water content when a mixture of a water-soluble organic solvent and water is released in the air at a constant temperature and a constant humidity, the evaporation of water in the solution and the absorption of water in the air into the ink is in an equilibrium condition. In the present embodiment, the water content equilibrium is determined as follows: a petri dish in which the water-soluble organic solvent is weighed in an amount of 1 g is stored for a period until the mass thereof does not change, in a desiccator in which the temperature and humidity are maintained at 23° C.±1° C. and 80%±3% using a saturated potassium chloride aqueous liquid, and the water content equilibrium is determined by the following equation.

Equilibrium Water Content (wt %)=(Amount of water absorbed into water-soluble organic solvent)+(Amount of water-soluble organic solvent+Amount of water absorbed into water-soluble organic solvent)×100

Examples of the water-soluble organic solvent for use in the liquid composition according to the present embodiment include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate. As a water-soluble organic solvent preferably used in the present embodiment, there may be exemplified a water-soluble organic solvent having an equilibrium water content of 30% by mass or more under the environment of 23° C. and 80% RH (which is referred to as "water-soluble organic solvent A", hereinbelow), and a water-soluble organic solvent having such an equilibrium water content of 40% by mass or more.

As the water-soluble organic solvent A, polyhydric alcohols are preferably used. Specific examples thereof include 1,2,3-butanetriol (atmospheric pressure (described only when the atmospheric pressure is not 1 hPa, measured at (bp (boiling point) 175° C./bp): 33 hPa; equilibrium water content: 38% by mass), 1,2,4-butanetriol (bp: 190° C. to 191° C./24 hPa; 41% by mass), glycerin (bp: 290° C.; 49% by mass), diglycerin (bp: 270° C./20 hPa; 38% by mass), triethylene glycol (bp: 285° C.; 39% by mass), tetraethylene glycol (bp: 324° C. to 330° C.; 37% by mass), diethylene glycol (bp: 245° C.; 43% by mass), 1,3-butanediol (bp: 203° C. to 204° C.; 35% by mass). Among these, glycerin, and 1,3-butanediol are particularly preferably used because they show a low viscosity when they contain water and can be stably maintained without causing the colorant to agglutinate. When the water-soluble organic solvent A is used in an amount of 50% by mass relative to the total amount of water-soluble organic solvents, it is preferable in that the discharge stability of the liquid composition can be improved, and fixing of the liquid composition on a recording apparatus can be prevented.

In the liquid composition according to the present embodiment, a water-soluble organic solvent having an equilibrium water content of less than 30% by mass at 23° C. and 80% RH (which is referred to as "water-soluble organic solvent B" hereinbelow) may be used instead of the water-soluble organic solvent A or in addition to the water-soluble organic solvent A. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other water-soluble organic solvents.

Specific examples of the polyhydric alcohols for the water-soluble organic solvent B include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196°

C. to 198° C.), tripropylene glycol (bp: 267° C.), hexylene glycol (bp: 197° C.), polyethylene glycol (viscosity-adjusted liquid to solid), polypropylene glycol (bp: 187° C.), 1,6-hexanediol (bp: 253° C. to 260° C.), 1,2,6-hexanetriol (bp: 178° C.), trimethylol ethane (solid, mp (melting point): 199° C. to 201° C.), and trimethylol propane (solid, mp: 61° C.).

Examples of the polyhydric alcohol alkyl ethers for the water-soluble organic solvent B include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp 197° C.), diethylene glycol monobutyl ether (bp: 231° C.), ethylene glycol mono-2-ethylhexyl ether (bp: 229° C.), and propylene glycol monoethyl ether (bp: 132° C.).

Examples of the polyhydric alcohol aryl ethers for the water-soluble organic solvent B include ethylene glycol monophenyl ether (bp: 237° C.), and ethylene glycol monobenzyl ether Examples of the nitrogen-containing heterocyclic compound for the water-soluble organic solvent B include 2-pyrrolidone (bp: 250° C., rap: 25.5° C., 47% by mass to 48% by mass), N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C. to 205° C.).

Examples of the amides for the water-soluble organic solvent B include formamide (bp: 210° C.), N-methylformamide (bp: 199° C. to 201° C.), N,N-dimethylformamide (bp: 153° C.), and N,N-diethylformamide(bp: 176° C. to 177° C.).

Examples of the amines for the water-soluble organic solvent B include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyldiethylamine (bp: 169° C.).

Examples of the sulfur-containing compounds for the water-soluble organic solvent B include dimethylsulfoxide (bp: 139° C.), sulfolane (bp: 285° C.), and thiodiglycol (bp: 282° C.).

As for the other solid water-soluble organic solvents for the water-soluble organic solvent B, sugar and the like are preferable.

Examples of the sugar include monosaccharides, disaccharides, oligosaccharides (including trisaccharides, and tetrasaccharides), and polysaccharides. Specific examples of the sugar include glucose, mannose, fructose, ribose, xylose, arabinose, galactose, maltose, cellobiose, lactose, sucrose, trehalose, and malttriose. Here, the tern "polysaccharides" means a saccharide in a broad sense, and is used herein it encompasses substances which are broadly present in nature such as α-cyclodextrin, and cellulose. In addition, as derivatives of these sugars, there may be exemplified reducing sugars of the above-mentioned sugars (e.g., sugar alcohol represented by Formula: $HOCH_2(CHOH)_nCH_2OH$ (where n is an integer of 2 to 5), acid sugar (e.g., aldonic acid, and uronic acid), amino acid, and thio acid. Among these, sugar alcohol is preferable. Specific examples of the sugar alcohol include maltitol, and sorbitol.

The amount of the water-soluble organic solvent contained in the liquid composition is not particularly limited. It is usually 10% by mass to 80% by mass, and more preferably 15% by mass to 60% by mass. When the water-soluble organic solvent content is more than 80% by mass, there is a probability that the drying properties of a recording medium to which the liquid composition has been made to adhere degrade. When the water-soluble organic solvent content is less than 10% by mass, water contained in the liquid composition easily vaporizes, and the viscosity of the liquid composition is increased as vaporization proceeds, which may lead to a failure in the coating step.

<Other Components>

Next, other components to be added to the liquid composition according to the present embodiment will be described. The liquid composition according to the present embodiment contains an organic acid ammonium salt and water, and may additionally contain a surfactant, a penetrant, an anti-foaming agent, and the like.

<<Surfactant>>

The liquid composition according to the present embodiment may contain a surfactant for improving the wetting properties of a recording medium; the image density and color saturation of a recorded matter, preventing white spots (this means that blank portions remain in image portions of a recorded matter), and for causing a vehicle in an ink speedily penetrate into a recording medium to thereby improve the fixability. In this case, the amount of the surfactant is preferably 0.001% by mass to 5% by mass, and more preferably 0.05% by mass to 2% by mass, relative to the total amount of the liquid composition. When the surfactant content is less than 0.001% by mass, the effect of adding the surfactant may be reduced, and when it is more than 5% by mass, it makes no difference in effect obtained by increasing the addition amount thereof.

The surfactant is not particularly limited and may be suitably selected in accordance with the intended use. Preferred examples of the surfactant include fluorine-based surfactants, silicone-based surfactants, nonionic surfactants, anionic surfactants, and betaine-based surfactants. Particularly preferred is at least one selected from fluorine-based surfactants and silicone-based surfactants. These surfactants may be used alone or in combination.

—Fluorine-Based Surfactant—

The fluorine-based surfactant is not particularly limited and may be suitably selected in accordance with the intended use. Examples thereof include a perfluoroalkyl sulfonic acid compound, a perfluoroalkyl carboxylic acid compound, a perfluoroalkyl phosphate ester compound, a perfluoroalkyl-ethylene oxide adduct, and a polyoxyalkylene ether polymer compound having a perfluoroalkyl ether group in the side chain. Among these, a fluorine-based surfactant having a perfluoroalkyl group is preferable. A fluorine-based surfactant represented by the following Formulae (F-1) to (F-4) is particularly preferable.

In addition, as the fluorine-based surfactant, a fluorine-based surfactant having 2 to 16 carbon atoms substituted with fluorine is preferable, and a fluorine-based surfactant having 4 to 16 such carbon atoms is more preferable. When the number of carbon atoms substituted with fluorine is less than 2, the effect of using the fluorine-based surfactant may not be obtained, and when it is more than 16, it may cause a problem with storage stability.

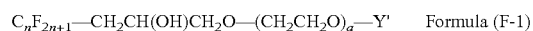

$$C_nF_{2n+1}-CH_2CH(OH)CH_2O-(CH_2CH_2O)_a-Y' \qquad \text{Formula (F-1)}$$

In Formula (F-1), n is an integer of 2 to 6; a is an integer of 15 to 50, and Y' represents $-C_bH_{2b+1}$ (b is an integer of 11 to 19) or $-CH_2CH(OH)CH_2-C_dF_{2d+1}$ (d is an integer of 2 to 6).

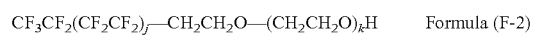

$$CF_3CF_2(CF_2CF_2)_j-CH_2CH_2O-(CH_2CH_2O)_kH \qquad \text{Formula (F-2)}$$

In Formula (F-2), j is an integer of 0 to 10, and k is an integer of 0 to 40.

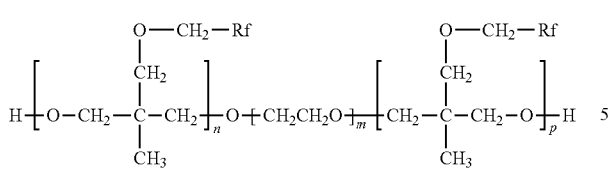

In Formula (F-3), Rf represents a perfluoroalkyl group; m is an integer of 6 to 25; and n and p each represent an integer of 1 to 4.

Formula (F-4)

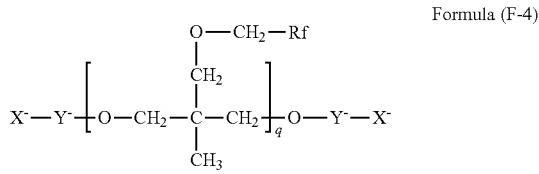

In Formula (F-4), Rf represents a perfluoroalkyl group; X represents a quaternary ammonium group; an alkali metal such as sodium and potassium; triethylamine, or tri ethanolamine; Y represents $-COO^-$, $-SO_3^-$, $-SO_4^-$, or $-PO_4^-$; and q is an integer of 1 to 6.

Preferred examples of a compound represented by (F-1) are compounds each represented by any one of the following structural formulae a) to u), for their high-ability to reduce a surface tension and their high penetration properties. Among these, compounds represented by e), f), s), t) or u) are preferable because of their excellence in compatibility with an anti-foaming agent represented by the following formula (4).

$C_4F_9$—COO—$(CH_2CH_2O)_{23}$—$C_{12}H_{25}$     a)

$C_4F_8$—$SO_2N(CH_3)$—$(CH_2CH_2O)_{21}$—$C_{12}H_{25}$     b)

$C_4F_9$—$CH_2CH_2O$—$(CH_2CH_2O)_{25}$—$C_{12}H_{25}$     c)

$H(CF_2)_4$—$CH_2OCH_2CH(OH)CH_2O$—$(CH_2CH_2O)_{21}$—$C_{14}H_{29}$     d)

$C_4F_9$—$CH_2CH(OH)CH_2O$—$(CH_2CH_2O)_{21}$—$C_{12}H_{25}$     e)

$C_4F_9$—$CH_2CH(OH)CH_2O$—$(CH_2CH_2O)_{25}$—$C_{12}H_{25}$     f)

$C_4F_9$—$CH_2CH(OH)CH_2O$—$(CH_2CH_2O)_{30}$—$C_{12}H_{25}$     g)

$C_4F_9$—$CH_2CH(OH)CH_2O$—$(CH_2CH_2O)_{20}$—$C_{14}H_{29}$     h)

$C_4F_9$—$CH_2CH(OH)CH_2O$—$(CH_2CH_2O)_{30}$—$C_{14}H_{29}$     i)

$C_4F_9$—$CH_2CH(OH)CH_2O$—$(CH_2CH_2O)_{23}$—$C_{16}H_{33}$     j)

$C_4F_9$—$CH_2CH(OH)CH_2O$—$(CH_2CH_2O)_{20}$—$C_{16}H_{33}$     k)

$C_4F_9$—$CH_2CH(OH)CH_2O$—$(CH_2CH_2O)_{25}$—$C_6H_{33}$     l)

$C_4F_9$—$CH_2CH(OH)CH_2O$—$(CH_2CH_2O)_{30}$—$C_{16}H_{33}$     m)

$C_4F_9$—$CH_2CH(OH)CH_2O$—$(CH_2CH_2O)_{40}$—$C_{16}H_{33}$     n)

$C_4F_9$—$CH_2CH(OF)CH_2O$—$(CH_2CH_2O)_{20}$—$C_{18}H_{37}$     o)

$C_4F_9$—$CH_2CH(OH)CH_2O$—$(CH_2CH_2O)_{30}$—$C_{18}H_{37}$     q)

$C_4F_9$—$CH_2CH(OH)CH_2O$—$(CH_2CH_2O)_{40}$—$C_{18}H_{37}$     r)

$C_4F_9$—$CH_2CH(OH)CH_2O$—$(CH_2CH_2O)_{23}$—$CH_2CH(OF)CH_2$—$C_4F_9$     s)

$C_4F_9$—$CH_2CH(OH)CH_2O$—$(CH_2CH_2O)_{35}$CH_2CH(OH)CH_2$—$C_4F_9$     t)

$C_4F_9$—$CH_2CH(OH)CH_2O$—$(CH_2CH_2O)_{45}$—$CH_2CH(OH)CH_2$—$C_4F_9$     u)

In a compound represented by Formula (F-1) above, a (Hydrophile-Lipophile Balance) value determined by Griffin's method is preferably 10 to 16 for the reason of the solubility in an aqueous ink. In addition, in the compound represented by Formula (F-1), a ratio of a molecular weight (MWEO) of a polyoxyethylene group [$(CH_2CH_2O)_a$ portion] to a molecular weight (MWF) of a fluoroalkyl group ($C_nF_{2n+1}$ portion and $C_mF_{2m+1}$ portion) is preferably 2.2 to 10 for the reason of balance between the functionality as a surfactant and the solubility in water.

In a compound represented by Formula (F-2) above, j is preferably an integer of 0 to 10, and k is preferably an integer of 0 to 40. As for the compound represented by (F-2) above, a commercially available fluorine-based surfactant can be used. Examples of such commercially available surfactant include SURFRON S-111, S-112, S-113, S-121, S-131, S-132, S-141, and S-145 (all (produced by Asahi Glass Co.); FLUORAD FC-93, FC-95, FC-98, FC-129, FC-135, FC-170C, FC-430, FC-431, and FC-4430 (all produced by Sumitomo 3M Ltd.); MEGAFACE F-470, F-1405, and F-474 (all produced by Dainippon Ink and Chemicals, Inc.); ZONYL FS-300, FSN, FSN-100, and FSO (all produced by DuPont); EFTOP EF-351, EF-352, EF-801, and EF-802 (all produced by Jemco Co.). Among these products, ZONYL FS-300, FSN, FSN-100, and FSO (all produced by DuPont) are particularly preferable for their high reliability and excellence in color saturation. These commercially products are each a mixture of compounds having several kinds of molecular weights, and in most case, j and k in Formula (F-2) have a distribution, however, in the present embodiment, these commercially available products can be used without any problems.

In a compound represented by (F-3) Formula above, as Rf, a perfluoroalkyl group is preferably used for the reason of the functionality as a surfactant. As for the perfluoroalkyl group, the one having 1 to 10 carbon atoms is preferable, and the one having 1 to 3 carbon atoms is more preferable. As such a perfluoroalkyl group, those represented by $-C_nF_{2n-1}$ (where n is an integer of 1 to 10) are exemplified. For example, $-CF_3$, $-CF_2CF_3$, $-C_3F_7$, and $-C_4F_9$ are exemplified. Among these perfluoroalkyl groups, $-CF_3$, and $-CF_2CF_3$ are particularly preferable. In a compound represented by Formula (F-3), m, n, and p each represent an integer; n is an integer of 1 to 4; m is an integer of 6 to 25; and p is preferably an integer of 1 to 4.

As Rf in a compound represented by Formula (F-4), a similar perfluoroalkyl group to that described in Formula (F-3) is preferably used. For example, $-CF_3$, $-CF_2CF_3$, $-C_3F_7$, $-C_4F_9$ and the like are preferably used. In a compound represented by Formula (F-4), X represents a cation group. For example, quaternary ammonium group; alkali metals such as sodium, and potassium; triethylamine, and triethanolamine are exemplified. Among these, quaternary ammonium group is particularly preferable. In the compound represented by Formula (F-4), Y represents an anion group. Examples thereof include $-COO^-$, $-SO_3^-$, $-SO_4^-$, and $-PO_4^-$. In the compound represented by Formula (F-4), q represents an integer, for example, of 1 to 6.

As the at least one fluorine-based surfactant selected from those represented by one of Formulae (F-3) and (F-4), a compound selected from compounds represented by one of Formulae (F-3-1) and (F-4-1) is preferable from the viewpoint of safety.

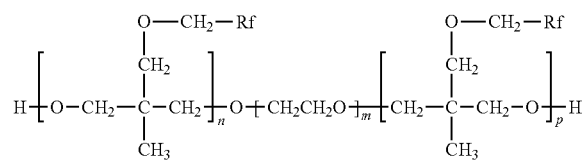
Formula (F-3-1)

In Formula (F-3-1), Rf represents —CF$_3$, or —CF$_2$CF$_3$; n represents an integer of 1 to 4; m is an integer of 6 to 25; and p is an integer of 1 to 4.

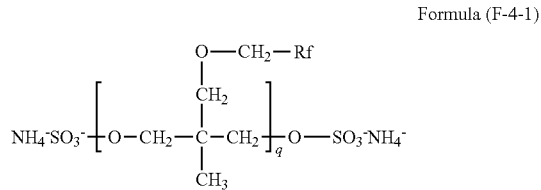
Formula (F-4-1)

In Formula (F-4-1), Rf represents —CF$_3$, or —CF$_2$CF$_3$; and q is an integer of 1 to 6.

The amount of the fluorine-based surfactant contained in the liquid composition according to the present embodiment is preferably 0.01% by mass to 10% by mass, and more preferably 0.03% by mass to 5% by mass. When the amount of the fluorine-based surfactant is less than 0.01% by mass, an effect of color saturation visually observable may not be obtained, and an effect of causing a vehicle in the ink speedily penetrate into a recording medium to improve the fixability may not be obtained. When the amount of the fluorine-based surfactant is more than 10% by mass, the effect may not change even when the addition amount thereof is increased, and the fluorine-based surfactant may not be dissolved in a pretreatment liquid, and thus the physical properties of the resulting liquid may be unstable.

In the inkjet pretreatment liquid according to the present embodiment, the fluorine-based surfactants selected from Formulae (F-1) to (F-4) may be used alone or in combination. Further, the fluorine-based surfactant may be used in combination with a nonionic surfactant, an anionic surfactant, an amphoteric surfactant, an acetylene glycol-based surfactant, or the like.

—Silicone-Based Surfactant—

The silicone-based surfactant is not particularly limited and may be suitably selected in accordance with the intended use. Examples of the silicone-based surfactant include side-chain-modified polydimethylsiloxane, both-terminal-modified polydimethylsiloxane, single-terminal-modified polydimethylsiloxane, and side-chain-both-terminal-modified polydimethylsiloxane. A polyether-modified silicone-based surfactant having a polyoxyethylene group or a polyoxyethylene polyoxypropylene group is particularly preferable, because it exhibits excellent properties as an aqueous surfactant. The polyether-modified silicone-based surfactant is not particularly limited and may be suitably selected in accordance with the intended use. Examples thereof include a compound in which a polyalkylene oxide represented by Formula (3) is introduced into Si portion side chain of dimethyl siloxane.

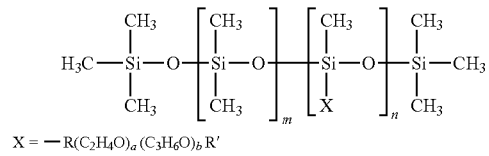
Formula (3)

$X = -R(C_2H_4O)_a(C_3H_6O)_bR'$

In Formula (3), m, n, a, and b each represent an integer; and R and R' each represent an alkyl group or an alkylene group.

As for such a silicone-based surfactant, a suitably synthesized one may be used, and a commercially available product may be used. Such a commercially available product is available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., etc. Examples of specific products of the polyether-modified silicone-based surfactant are KF-618, KF-642, and KF-643 (Shin-Etsu Chemical Co., Ltd.), EMALEX-SS-5602, and SS-1906EX (Nihon Emulsion Co., Ltd.), FZ-2105, FZ-2118, FZ-2154, FZ-2161, FZ-2162, FZ-2163, and FZ-2164 (TORAY Dow Corning Silicone Co., Ltd.), BYK-33, and BYK-387 (BYK Chemie GmbH).

—Anionic Surfactant—

The anionic surfactant is not particularly limited and may be suitably selected in accordance with the intended use. Examples of the anionic surfactant include salts of polyoxyethylene alkylether acetate, dodecylbenzene sulfonate, laurate, and polyoxyethylene alkylether sulfate. Examples of the nonionic surfactant include polyoxyethylene alkylether, polyoxypropylene polyoxyethylene alkylether, polyoxyethylene alkyl ester, polyoxyethylene sorbitan fatty acid ester, polyoxyethylene alkylphenyl ether, polyoxyethylene alkyl amine, and polyoxyethylene alkyl amide.

<<Penetrant>>

The liquid composition according to the present embodiment preferably contains at least one kind of penetrant. Preferred examples of the penetrant include non-wettable polyol compounds having 8 to 11 carbon atoms, and glycol ether compounds. Among these, preferred are those having solubility from 0.2% by mass to 5.0% by mass in water at 25° C., with 2-ethyl-1,3-hexanediol [solubility: 4.2% (25° C.)], and 2,2,4-trimethyl-1,3-pentanediol [solubility: 2.0% (25° C.)] being particularly preferable.

Examples of other non-wettable polyol compound include fatty acid diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol. Other penetrants usable in combination are not particularly limited, as long as it can be dissolved in the liquid composition to thereby control physical properties of the liquid composition to desired physical properties, and may be suitably selected in accordance with the intended use. Examples thereof include alkyl ethers and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether; and lower alcohols such as ethanol.

The amount of the penetrant contained in the liquid composition is preferably 0.1% by mass to 5.0% by mass. When the amount of the penetrant is less than 0.1% by mass, the effect of causing the liquid composition to penetrate into a recording medium may wear off. When the amount is more than 5.0% by mass, the penetrant segregates from the solvent due to the low solubility of the penetrant, and thus the effect of improving the permeability of the liquid composition may be saturated.

<<Anti-Foaming Agent>>

The liquid composition according to the present embodiment may contain an anti-foaming agent for the purpose of suppressing foaming (which means that a liquid is formed into a thin film to enfold air). Generally, a liquid having high surface tension, like water, hardly foams because a force of reducing the surface area thereof as much as possible works. Whereas a liquid having low surface tension and high viscosity easily foams, foams generated are retained and hardly removed. When the liquid composition according to the present embodiment contains the above-mentioned water-soluble cationic polymer, water-soluble organic solvent, surfactant and the like, the surface tension thereof decreases and the viscosity thereof increases. For this reason, the liquid composition easily foams. To prevent this, an anti-foaming agent is preferably used therein.

In the present embodiment, when the liquid composition contains the fluorine-based surfactant, the surface tension of the liquid composition is significantly reduced. In this case, an anti-foaming agent, which is a component insoluble in liquid, is used to intersperse this component in the surface of foams, and thereby foaming can be usually suppressed. However, such a component insoluble in liquid degrades discharge stability and storage stability. In the present embodiment, to prevent this problem, when the liquid composition contains a fluorine-based surfactant, an anti-foaming agent represented by Formula (4) is favorably used. The anti-foaming agent represented by Formula (4) has high compatibility with fluorine-based surfactants, and the anti-foaming agent is efficiently incorporated into a foamed film. It can be considered that for this reason, the surface of the foamed film is locally in an imbalance condition due to a difference in surface tension between the fluorine-based surfactant and the anti-foaming agent, and foams are broken.

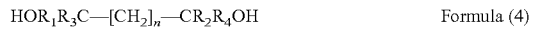

$$HOR_1R_3C-[CH_2]_n-CR_2R_4OH \quad \text{Formula (4)}$$

In Formula (4), $R_1$ and $R_2$ each independently represent an alkyl group having 3 to 6 carbon atoms; $R_3$ and $R_4$ each independently represent an alkyl group having 1 to 2 carbon atoms; and n is an integer of 1 to 6.

The anti-foaming agent represented by Formula (4) is not particularly limited and may be suitably selected in accordance with the intended use. However, 2,4,7,9-tetramethyl-decane-4,7-diol, and 2,5,8,11-tetramethyldodecane-5,8-diol are preferable, and from the viewpoints of anti-foaming effect and high solubility in the liquid composition, 2,5,8,11-tetramethyldodecane-5,8-diol is particularly preferable.

The amount of the anti-foaming agent contained in the liquid composition is preferably 0.01% by mass to 10% by mass, and more preferably 0.02% by mass to 5% by mass. When the amount of the anti-foaming agent is less than 0.01% by mass, the anti-foaming effect may not be sufficiently obtained. When it is more than 10% by mass, the anti-foaming effect may not change even when the addition amount thereof is increased, and the anti-foaming agent may not be dissolved in the liquid composition.

(Other Components)

The liquid composition according to the present embodiment may contain an antiseptic agent, an anti-corrosive agent etc, used in a typical ink, as required.

[Ink]

Next, a recording method according to the present embodiment will be described. The ink for use in the recording method of the present embodiment contains particles containing a colorant and having negative charges on their surfaces, and water. With this, the particles are dispersed in the ink by electrostatic repulsion. The color of the ink is not particularly limited and may be suitably selected in accordance with the intended use. Yellow, magenta, cyan, black and the like are exemplified. When recording is performed using an ink set in which two or more of these color inks, a color image can be recorded. When recording is performed using an ink set using at least three color inks in combination, a full color image can be recorded.

The ink is suitably used in an inkjet recording method using a recording apparatus such as a so-called piezo-type recording apparatus (see Japanese Patent Application Laid-Open (JP-A) No. 02-51734), a so-called thermal type recording apparatus (see Japanese Patent Application Laid-Open (JP-A) No. 61-59911), and a so-called electrostatic type recording apparatus (see Japanese Patent Application Laid-Open (JP-A) No. 06-71882). Also, the ink is suitably used in a recording apparatus having a function to heat a recording medium and ink in recording or before or after recording to accelerate fixing of a recorded matter. Further, the ink is also used in a recording apparatus which heats a recording medium and ink in recording or before or after recording to, for example, from 50° C. to 200° C. to accelerate fixing of a recorded matter.

Physical properties of the ink of the present embodiment are not particularly limited and may be suitably selected in accordance with the intended use. For example, the viscosity, and the surface tension of the ink are each preferably within the following ranges. First, the viscosity of the ink at 25° C. is preferably 5 mPa·s to 20 mPa·s. By adjusting the viscosity of the ink to 5 mPa·s or higher, the density and quality of an image to be recorded can be improved. Meanwhile, by adjusting the viscosity of the ink to 20 mPa·s or lower, excellent discharge stability can be obtained. Here, the viscosity can be measured using a viscometer (e.g., RE-550L, manufactured by TOKI SANGYO Co., Ltd.) at 25° C.

The surface tension of the ink at 25° C. is preferably 20 mN/m to 35 mN/m, and more preferably 20 mN/m to 30 mN/m. When the surface tension of the ink is from 20 mN/m to 35 mN/m, the permeability of the ink is enhanced, and even when the ink is recorded on regular paper, the drying properties are excellent, and thereby color bleeding can be suppressed. Further, the ink is easily wet in a liquid composition-attached portion of a recording medium (a portion of a recording medium onto which the liquid composition has been attached), the color saturation of a resulting recorded matter is increased, and the resistance to white spots is also improved. When the surface tension is higher than 35 mN/m, the leveling of the ink (which means that an ink is uniformly spread on a surface of a recording medium while wetting the surface thereof) easily occurs on a recording medium, which may lead to lengthening of drying time of the ink. Next, individual components contained in the ink will be described.

<Colorant>

In the ink, as a water-dispersible colorant, a pigment is mainly used from the viewpoint of weatherability, however, to control the color tone, a dye may be used in combination within a range not degrading the weatherability. The pigment is not particularly limited and may be suitably selected in accordance with the intended use. For example, an inorganic pigment or organic pigment for black color ink or an inorganic pigment or organic pigment for color ink is used. These pigments may be used alone or in combination.

The amount of the water-dispersible colorant contained in the ink is preferably, in terms of solid fraction, 2% by mass to 15% by mass, and more preferably 3% by mass to 12% by mass. When the amount of the pigment is less than 2% by mass, the color saturation and image density of a resulting recorded matter may decrease. When the amount of the pigment is more than 15% by mass, it is unfavorable because the discharge stability may degrade due to the increased viscosity of the ink. Here, the solid fraction content of the ink is measured, for example, by a method of isolating only the water-dispersible colorant and the water-dispersible resin fraction from the ink. In addition, when a pigment is used as the water-dispersible colorant, a ratio between the colorant and the water-dispersible resin is measured by determining a mass reduction rate through thermal mass spectrometry. When the molecular structure of the water-dispersible colorant is clearly known, the solid fraction of a pigment or dye can be determined through NMR (Nuclear Magnetic Resonance). As for heavy metal atoms, an inorganic pigment contained in a molecular skeleton, a gold-containing pigment, and a gold-containing dye, the solid fraction of the colorant can be determined through X-ray fluorescence analysis.

As the inorganic pigment, there may be used an titanium oxide, iron oxide, calcium carbonate, barium sulfate, aluminum hydroxide, barium yellow, cadmium red and chrome yellow; and carbon black produced by a conventionally known method such as a contact method, a furnace method, a thermal method or the like.

As the organic pigment, there may be used azo pigments (including azo lake, insoluble azo pigment, condensed azo pigment, chelate azo pigment, etc.) polycyclic pigments (e.g., phthalocyanine pigment, perylene pigment, perynone pigment, anthraquinone pigment, quinacridone pigment, dioxazine pigment, indigo pigment, thioindigo pigment, isoindolinone pigment, and quinophthalone pigment), dye chelates (e.g., basic dye-type chelate, and acid dye-type chelate), nitro pigments, nitroso pigments, and aniline black. Among these pigments, those having excellent affinity with water are particularly preferably used.

Specific examples of preferably usable black color pigments include carbon black such as furnace black, lamp black, acetylene black, and channel black, (C.I. Pigment Black 7), or metals such as copper, iron (C.I. Pigment Black 11), and titanium oxide, and organic pigments such as aniline black (C.I. Pigment Black 1). Specific examples of preferably usable color pigments include C.I. Pigment Yellow 1, 3, 12, 13, 14, 17, 24, 34, 35, 37, and 42 (yellow iron oxide), 53, 55, 74, 81, 83, 95, 97, 98, 100, 101, 104, 408, 109, 110, 117, 120, 128, 138, 150, 151, 153, 183, C.I. Pigment Orange 5, 13, 16, 17, 36, 43, and 51, C.I. Pigment Red 1, 2, 3, 5, 17, 22, 23, 31, 38, 48:2, and 48:2 (Permanent Red 2B(Ca)), 48:3, 48:4, 49:1, 52:2, 53:1, and 57:1 (Brilliant Carmine 6B), 60:1, 63:1, 63:2, 64:1, 81, 83, 88, and 101 (colcothar), 104, 105, 106, 108 (Cadmium Red), 112, 114, 122 (quinacridone magenta), 123, 146, 149, 166, 168, 170, 172, 177, 178, 179, 185, 190, 193, 209, and 219, C.I. Pigment Violet 1 (Rhodamine Lake), 3, 5:1, 16, 19, 23, and 38, C.I. Pigment Blue 1, 2, 15, 15:1, 15:2, 15:3 (phthalocyanine blue), 16, 17:1, 56, 60, 63, and C.I. Pigment Green 1, 4, 7, 8, 10, 17, 18, and 36.

In the present embodiment, the coloring material is dispersed as particles having a negative charge, in water. In this case, as a sub-embodiment of dispersing the pigment in water, there may be preferably exemplified first to third sub-embodiments described below. In the first sub-embodiment, a dispersoid obtained by incorporating a water-insoluble or water-sparsely soluble coloring material into polymer fine particles (which may be referred to as "a pigment coated with a resin) is dispersed in water serving as a dispersion medium to produce a polymer emulsion (a water dispersion of polymer fine particles containing a coloring material). Note that in this case, part of the dispersoid contains solid fractions, and in the present embodiment, this is referred to as "an emulsion". In the second sub-embodiment, a pigment having at least one hydrophilic group on its surface and showing water-dispersibility in the absence of dispersants (the pigment is, otherwise, referred to as "a self-dispersible pigment) is dispersed in water. In the third sub-embodiment, a pigment is dispersed in water using an anionic dispersant or a nonionic dispersant.

Examples of the polymer emulsion for use in the first sub-embodiment include a polymer emulsion in which a pigment is encapsulated in polymer fine particles or a pigment is adsorbed on surfaces of polymer fine particles. In this case, the entire pigment is not necessarily encapsulated in or adsorbed onto polymer fine particles, and it is allowable that the pigment is dispersed in the emulsion within a range not impairing the effects of the present embodiment. Examples of a polymer (polymer in polymer fine particles) forming the polymer emulsion include anionic vinyl polymers, polyester-based polymers, and polyurethane-based polymers. Particularly preferably usable polymers are vinyl-based polymers and polyester-based polymers. Polymers disclosed in Japanese Patent Application Laid-Open (JP-A) Nos. 2000-53897, 2001-139849 and the like can be used.

The self-dispersible pigment according to the second sub-embodiment is a pigment in which at least one hydrophilic group is bonded, directly or via another atomic group, to a surface of a pigment to modify the surface of the pigment. To modify the surface of the pigment, there may be used a method in which a predetermined anionic functional group (a functional group such as a sulfone group and a carboxyl group) is chemically bonded to a surface of a pigment or a method in which a pigment is subjected to a wet-process oxidation treatment using at least one of a hypohalous acid or a salt thereof. Of these methods, particularly preferred is a sub-embodiment in which a carboxyl group is bonded to a surface of a pigment and the pigment is dispersed in water. When a carboxyl group is bonded to a surface of a pigment, not only the dispersion stability of the pigment is improved, but also a high quality image can be obtained, and the water resistance of a resulting recorded recording medium is more improved. Further, an ink containing the self-dispersible pigment according to the second sub-embodiment is excellent in re-dispersibility, and even when recording is stopped for a long period of time and the water content of the ink filled in a nozzle in a recording apparatus is evaporated, excellent recording can be easily performed with a simple cleaning operation, without causing nozzle clogging. To obtain such properties, the volume average particle diameter ($D_{50}$) of the self-dispersible pigment in the ink is preferably 0.01 μm to 0.16 μm. Here, $D_{50}$ is also called a median diameter and means a diameter in which, when a particle is divided into two at a portion having a certain particle diameter, a larger side and a smaller side are in equal parts (e.g. volume average particle diameter). Note that, in the present embodiment, when a self-dispersible pigment according to the second sub-embodiment is used, the ink preferably contains a water-dispersed resin, which will be described below, for improving the fixability (abrasion resistance) of the colorant on a recording medium and improving the color-developing ability.

When the self-dispersible pigment is a self-dispersible carbon black, as an anionic functional group to be bonded to the carbon black, there may be exemplified —COOM, —$SO_3M$, —PO₃HM, —PO₃M₂, —SO₂NH₂, and —SO₂NHCOR (where M represents an alkali metal, ammonium or organic ammonium; and R represents an alkyl group having 1 to 12 carbon atoms, a phenyl group that may have a substituent or a naphthyl group that may have a substituent.). Among these, —COOM, and —SO₃M are preferable. When "M" in the above-mentioned functional group is an alkali metal, for example, there may be used lithium, sodium, or potassium. When "M" is organic ammonium, for example, there may be used monomethyl to trimethyl ammonium, monoethyl to triethyl ammonium or monomethanol to trimethanol ammonium. The functional group may be bonded to a surface of carbon black via other atomic groups. Examples of the other atomic groups include an alkyl group having 1 to 12 carbon atoms, a phenyl group that may have a substituent or a naphthyl group that may have a substituent. Specific examples of the functional to be bonded on a surface of carbon black via other atomic groups include —C₂H₄COOM (where M represents an alkali metal or quaternary ammonium.), and —PhSO₃M (where Ph represents a phenyl group; and M represents an alkali metal or quaternary ammonium.).

When the self-dispersible pigment is a color pigment, the above-mentioned anionic functional group (e.g., —COONa) can be introduced into the color pigment by a method in which the color pigment is subjected to an oxidation treatment using hypochlorous acid soda, a method of sulfonating the color pigment, a method of reacting a diazonium salt with the color pigment or the like.

In the third sub-embodiment, the above-mentioned pigment is dispersed in water by an anionic dispersant or a nonionic dispersant. Examples of the anionic dispersant include polyoxyethylene alkylether acetate, an alkylbenzene sulfonic acid salt (NH₄, Na, Ca), an alkyldiphenylether disulfonic acid salt (NH₄, Na,Ca), a sodium salt of dialkylsuccinate sulfonate, a sodium salt of a naphthalene sulfonate-formalin condensate, an ester salt of a polyoxyethylene polycyclic phenylether sulfate (NH₄,Na), a lauric acid salt, a sulfate salt of polyoxyethylene alkylether, and an oleic acid salt. Among these, particularly preferable specific examples of the anionic surfactant include a sodium salt of dioctyl sulfosuccinate and a NH₄ salt of polyoxyethylene styrene phenylether sulfonate.

As the nonionic surfactant, a nonionic surfactant having an HLB value of 10 to 20 is preferable. Examples thereof include polyoxyethylene alkylether, polyoxyalkylene alkyl ether, polyoxyethylene polycyclic phenyl ether, sorbitan fatty acid ester, polyoxyethylene alkyl phenyl ether, polyoxyethylene alkyl amine, polyoxyethylene alkyl amide, and acetylene glycol. Among these, particularly preferable specific examples of the nonionic surfactant include polyoxyethylene lauryl ether, polyoxyethylene-β-naphthylether, polyoxyethylene sorbitan monooleate, and polyoxyethylene styrene phenyl ether. Note that, when a nonionic dispersant is used, the entire system of the ink can also be negatively charged by using a negatively charged resin emulsion in combination.

In the third sub-embodiment, the pigment dispersion is produced in the following method. First, the above-mentioned pigment dispersant is dissolved in an aqueous medium. Next, the organic pigment or the inorganic pigment is added thereto, and the system is sufficiently wetted, followed by high-speed stirring through use of a homogenizer, or stirring and dispersing through use of a dispersing machine using a ball such as a bead mill and a ball mill, a dispersion kneader using a shearing force such as a roll mill, a ultrasonic wave dispersing machine, or the like. In most cases, coarse particles are contained in the resulting pigment dispersion after such a kneading/dispersing step. This causes nozzle clogging and/or clogging of an ink-supply channel in a recording apparatus, and thus there is a need to remove particles having a particle diameter of 1 µm or greater using a filter or a centrifugal separator.

In the present embodiment, it is preferable that the dispersant be used in an amount of 1% by mass to 100% by mass, and more preferably in an amount of 10% by mass to 50% by mass, relative to the amount of the pigment. When the amount of the dispersant is small, it is impossible to form the pigment into sufficiently fine particles. When the amount of the dispersant is excessively large, excess components of the dispersant not adsorbed on the pigment adversely affect physical properties of the resulting ink, which may cause ink bleeding, and degradation of water resistance and abrasion resistance of an image to be recorded. Note that in the present embodiment, when the self-dispersible pigment according to the third sub-embodiment is used, the ink preferably contains a water-dispersed resin, which will be described below, for improving the fixability (abrasion resistance) of the colorant on a recording medium and improving the color-developing ability.

Further, to stabilize the pigment dispersion, a water-soluble polymer compound having an average molecular weight of 30,000 or lower may be used in combination. As the water-soluble polymer compound, generally, a water-soluble styrene-acrylic resin, water-soluble polyurethane, water-soluble polyester, water-soluble styrene-maleic acid copolymer, and water-soluble α-olefin-maleic acid copolymer each having a molecular weight of 30,000 or lower are preferable. Among these, water-soluble polyurethane, water-soluble polyester, and a water-soluble α-olefin-maleic acid copolymer represented by Formula (5) are particularly preferable.

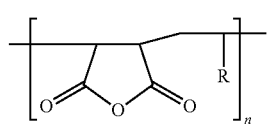

(5)

In Formula (5), R represents an alkyl group having 6 to 22 carbon atoms, and n is an integer of about 30 to about 100.

The acid value of the water-soluble α-olefin-maleic acid copolymer represented by Formula (5) is preferably 100 mgKOH/g to 400 mgKOH/g. When the acid value is lower than 100, the solubility of the pigment dispersion may degrade. In contrast, when the acid value is higher than 400, the viscosity of the pigment dispersion increases, and there is a potential that the ink-discharge properties easily degrade and the dispersion stability of the pigment dispersion easily degrades. The weight average molecular weight of the water-soluble α-olefin-maleic acid copolymer represented by Formula (5) is preferably 5,000 to 20,000. When the weight average molecular weight is lower than 5,000, the dispersion stability of the pigment dispersion may degrade. In contrast, when the weight average molecular weight is higher than 20,000, the solubility of the pigment dispersion may degrade, and the viscosity thereof may increase.

The amount of the water-soluble polymer compound contained in the pigment is preferably 1% by mass to 100% by mass (in terms of solid fraction), and more preferably 5% by mass to 50% by mass. When the amount of the water-soluble polymer compound is less than 1% by mass, the effect of improving the dispersion stability may be insufficient. In contrast, when the amount of the water-soluble polymer compound is higher than 100% by mass, the viscosity of the ink increases, the discharge stability thereof may degrade, and it may make no difference in the effect of improving the dispersion stability even when the addition amount thereof is increased.

The volume average particle diameter ($D_{50}$) of the pigment of the present embodiment is preferably 150 nm or smaller in an ink, and more preferably 100 nm or smaller. When the volume average particle diameter ($D_{50}$) of the pigment is greater than 150 nm, the discharge stability of the resulting ink rapidly degrades, and nozzle clogging and ink ejection deviation easily occur. In contrast, when the volume average particle diameter ($D_{50}$) is 100 nm or smaller, the discharge stability is improved, and the color saturation of an image is also improved. The amount of the pigment in the ink is preferably about 1% by mass to about 15% by mass, and more preferably about 2% by mass to about 12% by mass. Moreover, the polymer emulsion according to the first sub-embodiment in which a pigment is coated with anionic polymer fine particles, and the self-dispersible pigment according to the second sub-embodiment, and the water-dispersible colorant according to the third sub-embodiment may be used in combination in the form of a mixture.

<Water-Soluble Organic Solvent>

As a water-soluble organic solvent for use in the ink, a similar water-soluble organic solvent to that used in the liquid composition is preferably used. The mass ratio of the water-dispersible colorant to the water-soluble organic solvent in the ink influences the discharge stability of the ink discharged from an inkjet head. For example, when the amount of the water-soluble organic solvent is small although the solid fraction of the water-dispersible colorant is high, evaporation of water present in the vicinity of an ink meniscus of a nozzle may proceed to cause a discharge defect. The amount of the water-soluble organic solvent contained in the ink is preferably 20% by mass to 50% by mass, and more preferably 20% by mass to 45% by mass. When the water-soluble organic solvent content is less than 20% by mass, there is a possibility that the discharge stability degrades and a waste ink adheres to a maintenance device in a recording apparatus. When the water-soluble organic solvent content is more than 50% by mass, the drying properties thereof may degrade on a paper surface, and the quality of a recorded matter may further degrade.

<Surfactant>

As a surfactant for use in the ink, a similar surfactant to that used in the liquid composition of the present embodiment is preferably used. Among these preferably usable surfactants, it is preferable to select a surfactant having low surface tension and high permeability and high leveling properties, without impairing the dispersion stability of the pigment dispersion depending on the combination type of the water-dispersible colorant and the water-soluble organic solvent used. Specifically, at least one selected from an anionic surfactant, a nonionic surfactant, a silicone-based surfactant and a fluorine-based surfactant is preferably used. Among these, a silicone-based surfactant and a fluorine-based surfactant are particularly preferably used. These surfactants may be used alone or in combination. The amount of the surfactant contained in the ink is preferably 0.01% by mass to 3.0% by mass, and more preferably 0.5% by mass to 2% by mass. When the surfactant content is less than 0.01% by mass, the effect obtained when adding the surfactant may be insufficient, and whereas, when it is more than 3.0% by mass, the permeability of the ink to a recording medium is increased more than necessary, the image density of a recorded image may degrade, and strikethrough (this means that the ink attached to a recording medium penetrates through the recording medium and is distinguished from the rear surface of the recorded image) may occur.

<Penetrant>

A penetrant for use in the ink, a similar penetrant to that used in the liquid composition of the present embodiment is preferably used. The amount of the penetrant contained in the ink is preferably 0.1% by mass to 4.0% by mass. When the penetrant content is less than 0.1% by mass, the drying properties of the ink degrades, and ink bleeding may occur in a recorded image. When the penetrant content is more than 4.0% by mass, the dispersion stability of the colorant is impaired, nozzle clogging may easily occur in a recording apparatus, and the permeability of the ink to a recording medium is increased more than necessary, which may cause a decrease in image density of a recorded matter and strikethrough.

<Water-Dispersible Resin>

The above-mentioned water-dispersible resin is formed into a film on a recorded matter onto which the ink has been made to adhere, and is used for improving the water repellency, water resistance and weatherability of a recorded image and improving the image density and color saturation thereof. As for the water-dispersible resin, both a homopolymer and a composite resin made of a copolymer may be used, and any of a single-phase structured type emulsion, a core-shell type emulsion and a power-feed type emulsion may be used. In addition, as for the water-dispersible resin, both a water-dispersible resin in which a resin itself has a hydrophilic group and self-dispersibility and a water-dispersible resin in which a resin itself does not have dispersibility and to which the dispersibility is imparted by a surfactant and a resin having a hydrophilic group may be used. Examples of this water-dispersible resin include condensed type synthetic resins, addition type synthetic resins, and natural polymer compounds.

Examples of the condensed type synthetic resins include polyester resins, polyurethane resins, polyepoxy resins, polyamide resins, polyether resins, poly(meth)acrylic resins, acryl-silicone resins, and fluorine-based resins. Examples of the addition type synthetic resins include polyolefin resins, polystyrene-based resins, polyvinyl alcohol-based resins, polyvinyl ester-based resins, polyacrylic acid-based resins, and unsaturated carboxylic acid-based resins. Examples of the natural polymer compounds include celluloses, rosins, and natural rubbers. Among these, polyurethane resin fine particles, acryl-silicone resin fine particles, and fluorine-based resin fine particles are particularly preferable. These water-dispersible resins may be used in combination.

Here, as for the fluorine-base resin, fluorine-based resin fine particles having a fluoroolefin unit are preferable. Among these, fluorine-containing vinylether-based resin fine particles composed of a fluoroolefin unit and a vinylether unit are particularly preferable. The fluoroolefin unit is not particularly limited and may be suitably selected in accordance with the intended use. Examples thereof include —$CF_2CF_2$—, —$CF_2CF(CF_3)$—, and —$CF_2CFCl$—. The vinylether unit is not particularly limited and may be suitably selected in accordance with the intended use. Examples thereof include compounds represented by each of the following structural formula.

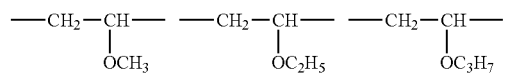

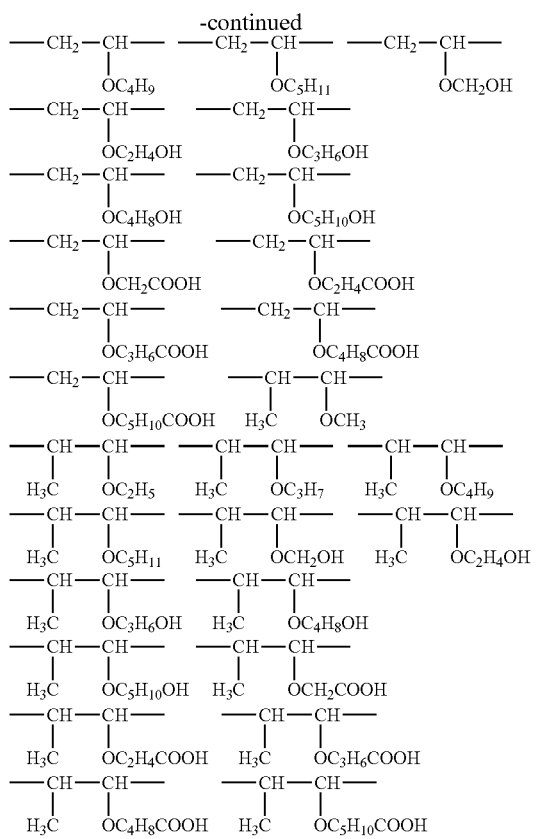

As for the fluorine-containing vinylether-based resin fine particles composed of a fluoroolefin unit and a vinylether unit, an alternate copolymer in which a fluoroolefin unit and a vinylether unit are alternately copolymerized is preferable. As such fluorine-based resin fine particles, suitably synthesized one and a commercially available product may be used. Here, as commercially available products thereof, there may be exemplified FLUONATE FEM-500, FEM-600, DICGUARD F-52S, F-90, F-90M, F-90N and AQUAFURAN TE-5A produced by Dainippon Ink Chemical Industries Co., Ltd.; LUMIFLON FE4300, FE4500, FE4400, ASAHI GUARD AG-7105, AG-950, AG-7600, AG-7000, and AG-1100 produced by Asahi Glass Co., Ltd.

As the water-dispersible resin, a water-dispersible resin in which a resin itself has a hydrophilic group and self-dispersibility and a water-dispersible resin in which a resin itself does not have dispersibility and to which the dispersibility is imparted by a surfactant and a resin having a hydrophilic group are used. Of these, an emulsion of resin particles obtained by emulsification or suspension polymerization of an ionomer of a polyester resin, a polyurethane resin or an unsaturated monomer is preferably used. Here, when an unsaturated monomer is emulsion polymerized, a water-dispersible resin is easily produced because a resin emulsion is obtained by reacting water into which the unsaturated monomer, a polymerization initiator, a surfactant, a chain transfer agent, a chelating agent, a pH adjustor etc. have been added. In this case, a water-dispersible resin having intended physical properties can be easily produced because components constituting the resin are easily changed.

As for the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, oligomers having an unsaturated carbon etc. can be used alone or in combination. The physical properties of a water-dispersible resin produced can be easily changed by using these monomers in combination. Further, the physical properties of the resin can also be modified by subjecting the components to a polymerization reaction or graft reaction using, as a polymerization initiator, an oligomer type polymerization initiator.

Examples of the unsaturated carboxylic acids serving as the unsaturated monomer include an acrylic acid, methacrylic acid, itaconic acid, fumaric acid, and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyl trimethyl ammonium salts, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Examples of the polyfunctional (meth)acrylic acid ester monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane tri methacrylate, trimethylol ethane tri methacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropylenephenyl)propane, 2,2'-bis(4-acryloxydiethoxyphenyl)propane trimethylol propane triacrylate, trimethylolethane triacrylate, tetramethylolmethane triacrylate, ditrimethylol tetraacrylate, tetramethylol methane tetraacrylate, pentaerythritol tetraacrylate, and dipentaerythritol hexaacrylate.

Examples of the (meth)acrylic acid amide monomers include acrylamide, methacrylamide, N,N-dimethyl acrylamide, methylene bis-acrylamide, and 2-acrylamide-2-methylpropane sulfonic acid.

Examples of the aromatic vinyl monomers include styrene, α-methylstyrene, vinyl toluene, 4-t-butylstyrene, chlorostyrene, vinyl anisole, vinyl naphthalene, and divinyl benzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinyl pyrrolidone, vinyl sulfonic acid or salts thereof, vinyl trimethoxysilane, and vinyl triethoxysilane.

Examples of the allyl compound monomers include allylsulfonic acid or salts thereof, allylamine, allyl chloride, diallylamine, and diallyldimethyl ammonium salts.

Examples of the olefin monomers include ethylene, and propylene.

Examples of the diene monomers include butadiene, and chloroprene.

Examples of the oligomers having an unsaturated carbon include styrene oligomers each having a methacryloyl group, styrene-acrylonitrile oligomers each having a methacryloyl group, methyl methacrylate oligomers each having a methacryloyl group, dimethyl siloxane oligomers each having a methacryloyl group, and polyester oligomers each having an acrylonitrile group.

Since a water-dispersible resin undergoes dispersion breaking and breaking of molecular chains due to hydrolysis, under a strong alkaline or strong acidic condition, the pH of the water-dispersible resin before being prepared into an ink is preferably 4 to 12. Particularly, from the viewpoint of miscibility with a water-dispersible colorant, the pH is pH is more preferably 6 to 11, and still more preferably 7 to 9. The average particle diameter ($D_{50}$) of the water-dispersible resin relates to the viscosity of the dispersion liquid. When water-dispersible resins having the same composition and the same concentration of solid fraction, the smaller the particle diameter, the higher the viscosity is. Therefore, the average particle diameter ($D_{50}$) of the water-dispersible resin is preferably 50 nm or greater so that the viscosity of the resulting ink is not excessively high. When the particle diameter of the water-dispersible resin is several ten micrometers, it is greater than the diameter of a nozzle of an inkjet head in a recording apparatus. When such particles having large particle diameters are present in the resulting ink, the discharge stability of the ink degrades. Then, to secure the discharge stability of the ink, the average particle diameter ($D_{50}$) of the water-dispersible resin is preferably 200 nm or smaller, and more preferably 150 nm or smaller.

Further, since the water-dispersible resin has a function to fix a water-dispersible colorant on a recording medium, it is preferable to form it into a film at normal temperature. For this reason, the minimum film-forming temperature (MFT) of the water-dispersible resin is preferably 30° C. or lower. In addition, when the glass transition temperature of the water-dispersible resin is lower than −40° C., the consistency of the resin film is higher, and tacking (which means stickiness, and viscosity) may occur on a recorded matter. For this reason, the glass transition temperature of the water-dispersible resin is preferably −40° C. or higher, and more preferably −30° C. or higher. The amount of the water-dispersible resin contained in the ink is preferably, in terms of solid fraction, 1% by mass to 15% by mass, and more preferably 2% by mass to 7% by mass.

<Other Components>

Next, other components that can be added to an ink used in the recording method of the present embodiment will be described. Such other components are not particularly limited and may be suitably selected as required. Examples thereof include a pH adjustor, an antiseptic-antifungal agent, a chelating reagent, an anti-corrosive agent, an antioxidant, a ultraviolet absorber, an oxygen absorbent, and a light stabilizer.

—pH Adjustor—

The pH adjustor is not particularly limited, as long as it can adjust the pH of an ink formulated to 7 to 11 without adversely affecting the ink, and may be suitably selected in accordance with the intended use. When the pH of the ink is lower than 7 or higher than 11, it melts down a head in a recording apparatus and a unit for supplying the ink, and deteriorates the ink or leaks, and failures such as discharge defect may occur. Examples of the pH adjustor preferably used in the present embodiment include alcohol amines, hydroxides of alkali metal elements, ammonium hydroxides, phosphonium hydroxides, and carbonates of alkali metals.

Examples of the alcohol amines include diethanolamine, triethanolamine, and 2-amino-2-ethyl-1,3-propane diol. Examples of the hydroxide of alkali metal element include lithium hydroxides, sodium hydroxides, and potassium hydroxides. Examples of the hydroxide of ammonium include ammonium hydroxides, quaternary ammonium hydroxides, and quaternary phosphonium hydroxides. Examples of the carbonate of alkali metal include lithium carbonates, sodium carbonates, and potassium carbonates.

—Antiseptic-Antifungal Agent—

As the antiseptic-antifungal agent, there may be preferably used, for example, sodium dehydroacetate, sodium sorbate, sodium 2-pyridinethiol-1-oxide, sodium benzoate, sodium pentachlorophenol, and a 1,2-benzoisothiazoline-3-on sodium compound.

—Chelate Reagent—

As the chelate reagent, there may be preferably used, for example, sodium ethylenediamine tetraacetate, sodium nitrilo triacetate, sodium hydroxyethyl ethylenediamine triacetate, sodium diethylene triamine pentaacetate, and sodium uramil diacetate.

—Anticorrosive Agent—

As the anticorrosive agent, there may be preferably used, for example, acid sulfite, sodium thiosulfate, ammonium thiodiglycolate, diisopropyl ammonium nitrite, pentaerythritol tetranitrate, dicyclohexyl ammonium nitrite, and 1,2,3-benzotriazole.

—Antioxidant—

As the antioxidant, there may be preferably used, for example, phenol-based antioxidants (including hindered phenol-based antioxidants), amine-based antioxidants, sulfur-based antioxidants, and phosphorous-based antioxidants.

—Ultraviolet Absorbent—

As the ultraviolet absorbent, there may be preferably used, for example, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

[Ink Production Method]

An ink is produced by dispersing or dissolving a water-dispersible colorant, a water-soluble organic solvent, a surfactant, a penetrant and water, and further, when necessary, other components, in an aqueous medium, and further, as required, by stirring and mixing these components. The stirring and mixing can be perfumed by a sand mill, a homogenizer, a ball mill, a paint shaker, an ultrasonic dispersing machine or the like, and also performed by a stirrer using stirring blades, a magnetic stirrer, a high-speed dispersing machine or the like.

(Recording Method)

Hereinafter, a recording method according to the present invention will be further described by way of preferred embodiments. A recording method according to the present embodiment includes making the liquid composition according to the present embodiment adhere onto a recording medium, and making an ink adhere to the recording medium onto which the liquid composition has been made to adhere. Each of these steps will be described hereinbelow.

—Recording Medium—

As a recording medium for use in the recording method according to the present embodiment, regular paper having no coating layer is preferably used. In particular, the recording medium is preferably regular paper having a size degree of 10S or higher and an air permeability of 5S to 50S, which is used as copy paper and the like.

<Step of Making Liquid Composition Adhere onto Recording Medium>

The step of making the liquid composition adhere onto a recording medium is not particularly limited, and a method may be used in which the liquid composition according to the present embodiment is uniformly applied to a surface of a recording medium so that the liquid composition is attached thereon. Examples of such a method include a blade coating method, a gravure coating method, a gravure offset coating method, a bar coating method, a roll coating method, a knife coating method, an air-knife coating method, a comma coating method, a U-comma coating method, an AKKU coating method, a smoothing coating method, a micro gravure coating method, a reverse roll coating method, coating method using four rollers or five rollers, a dip coating method, a curtain coating method, a slide coating method, and a die coating method.

The wet adhesion amount of the liquid composition (which means an adhesion amount of the liquid composition before a recording medium is dried) to the recording medium in the step of making the liquid composition adhere onto a recording medium is preferably 0.1 g/m$^2$ to 30.0 g/m$^2$, and more preferably 0.2 g/m$^2$ to 10.0 g/m$^2$. When the wet adhesion amount is less than 0.1 g/m$^2$, the image quality (image density, color saturation, color bleeding, and feathering) of a recorded matter may not be improved. When the wet adhesion amount is more than 30.0 g/m$^2$, the texture of a recorded matter may be impaired and curling may occur. Note that, when necessary, a drying step may be provided to dry the recording medium onto which the liquid composition has been made to adhere. In this case, the recording medium may be dried by a roll heater, a drum heater, or hot air.

<Step of Making Ink Adhere onto Recording Medium>

The step of making an ink adhere onto a recording medium in the recording method of the present embodiment is a step in which an ink is applied to the recording medium onto which the liquid composition of the present embodiment has been made to adhere so that the ink is attached thereon, and thereby an image is recorded on the recording medium. As the method of making an ink adhere onto a recording medium, a method is preferably used in which an impulse (energy) is applied to an ink by a predetermined device to discharge the ink, and thereby the ink is made adhere onto the recording medium. More specifically, any known inkjet recording methods can be employed. Examples of such inkjet recording methods include an inkjet recording method through scanning with an inkjet recording head, and an inkjet recording method in which an image is recorded on a certain sheets of recording media by using a line-type inkjet recording head.

In the step of making the ink adhere to the recording medium, the driving method of a recording head serving as a unit of discharging an ink is not particularly limited, and may be suitably selected in accordance with the intended use. Examples of the driving method include a method of operating or using a piezoelectric element actuator using PZT (lead zirconate titanate) or thermal energy; a method of using an on-demand-type recording head using an actuator utilizing an electrostatic force; and a recording method using a continuous jetting type-charge controllable recording head. In the method of operating heat energy, it is said to be difficult to arbitrarily control the jetting of liquid droplets, and the quality of images recorded is prone to significantly vary depending on the type of a recording medium used. This problem is, however, resolved by giving the liquid composition to the recording medium, and it is possible to obtain a stable and high quality recorded matter irrespective of the type of the recording medium used. Note that the step of making an ink adhere onto a recording medium exhibits its effect to a recording medium on which surface has been sufficiently dried as well as to a recording medium on which surface has not been dried.

[Recording Apparatus]

A recording apparatus for recording an image by applying the liquid composition to a recording medium and applying an ink to the recording medium with the liquid composition having adhered to a surface thereof to thereby record an image on the recording medium will be described with reference to a specific example illustrated in FIG. 2. The recording apparatus illustrated in FIG. 2 is a recording apparatus which records an image by scanning the inkjet recording head. In the recording apparatus illustrated in FIG. 2, a recording medium 6 is sent out by a paper-feed roller 7, and a liquid composition 1 is uniformly and thinly applied onto the recording medium 6 by an applying roller 4 and a counter roller 5. The liquid composition 1 is pumped up by a pump-up roller 3 and uniformly applied to the applying roller 4 by a film thickness controlling roller 2. The recording medium 6 onto which the liquid composition 1 has been applied is then fed to a recording-scanning section where an inkjet recording head 20 is present. Since the length of a paper conveyance route from a start portion (B portion in FIG. 2) of recording-scanning to an end portion (A portion in FIG. 2) of the operation of applying the liquid composition is designed to be longer than the length of the recording medium in the feeding direction, application of the liquid composition can be finished at the point where the recording medium reaches the start portion of recording-scanning. In this case, since application of the liquid composition can be carried out before the inkjet recording head 20 starts scanning for recording and the recording medium 6 is intermittently conveyed, the liquid composition can be continuously applied to the recording medium 6 in a state where the conveyance speed of the recording medium 6 is constant and uniformly applied thereto without nonuniformity. Note that the recording apparatus example illustrated in FIG. 2 is configured so that the recording medium 6 onto which the liquid composition is necessary to be applied is supplied from a lower cassette, and other recording media 17 are supplied from an upper cassette, and thus this is advantageous to provide a longer conveyance route for a recording medium.

FIG. 3 illustrates another example of the recording apparatus of the present embodiment. The recording appartus example illustrated in FIG. 3 is also an example of a recording apparatus which records by scanning an inkjet head, and this recording apparatus is designed in more compact than the recording apparatus illustrated in FIG. 2. A recording medium 17 is sent out by a paper feeding roller 18, and a liquid composition 1 is uniformly applied in a thin thickness to the recording medium 17 by an applying roller 4 and a counter roller 5. The liquid composition 1 is pumped up by a pump-up roller 3 and uniformly applied to the applying roller 4 by a film thickness control roller 2. The recording medium 17 passes a recording-scanning portion where an inkjet recording head 20 is present while being applied thereto, and fed until the application of the liquid composition 1 to the recording medium 17 is completed. At the time when the application is completed, the recording medium 17 is returned back again until a tip portion thereof reaches a recording-scanning start portion. The completion of the application is detected by proving a known recording medium-detection unit (not illustrated) in the vicinity of the outlet of a liquid composition applying unit in the recording apparatus. This detection unit is not necessarily provided to the recording apparatus, and the recording apparatus may be systematically configured so that the feed amount of the recording medium along the outer peripheral of the conveyance roller corresponds to the length of the recording medium by preliminarily inputting information on the length of the recording medium in a controller and controlling the number of revolutions of the motor.

When double-sided recording is performed, the recording medium 17 onto which the liquid composition 1 has been applied is conveyed again to the recording-scanning portion before the liquid composition is dried and solidified. At this point in time, the recording medium 17 is intermittently conveyed in synchronization with scanning of the inkjet recording head 20. When the recording medium is made returned to the same route as that it is sent from first, the rear end of the recording medium reversely enters to the liquid composition applying device. This causes failures such as coating nonuniformity, smear, and jamming of the recording medium. When the recording medium is made returned back, the direction thereof is switched by a recording medium guide 31. That is, when the recording medium 17 is sent in the reverse direction after the liquid composition 1 is applied to the recording medium 17, the recording medium guide 31 is moved to a portion indicated by a dotted line in the figure by a known unit such as a soleide and a motor. With this, the recording medium 17 is conveyed to the position of a recording medium return guide 34, and thus it is possible to prevent occurrence of smear and jamming of the recording medium.

The step of making the liquid composition adhere to the recording medium is preferably performed at a constant linear speed of 10 mm/s to 1,000 mm/s. Therefore, in this recording apparatus example, using sheets of a recording medium, when focused on a certain recording medium sheet, after the process of applying the liquid composition onto the recording medium is finished for the certain recording medium sheet, a process of making an ink adhere to a surface thereof and image processing is started. In such a recording apparatus, in most cases, the speed of applying a liquid composition is inconsistent with the speed of recording an image, and thus there is a time lag between a recording start portion and a recording end portion of recording sheets of paper, from the time when the liquid composition is applied to the recording medium to the time when the image is recorded. Even when the time lag is significant, in a liquid composition which contains a water-soluble organic solvent having a boiling point higher than that of water and low evaporation speed, and in which the water content ratio is adjusted so as to be an amount nearly in equilibrium with the water content in air under an environment a printer is used, evaporation of water is remarkably suppressed. Thus, a difference in image quality caused between a recording start portion and a recording end portion can be reduced to the level where it can be, at least, visually observed.

As clearly understood from the conveyance step of a recording medium in this recording apparatus, in most cases, there is a need to convey a recording medium to which a liquid composition is applied, through use of a unit for contacting the recording medium, such as a roller, a small roller, and guide. In this case, when the liquid composition having adhered to the recording medium is transferred to conveyance members, it may cause problems, for example, failures occur in the conveyance function, and smear is accumulated to cause degradation in quality of images. In this case, the occurrence of such problems is reduced by providing a wavy plate guide in a recording medium, providing a spur-shaped small roller, and/or using a water-repellent material for a roller surface.

To control the operation of a recording apparatus as illustrated in FIGS. 2 and 3, when a recording apparatus receives a printing direction from a host machine such as a personal computer, the recording apparatus starts a head cleaning work and a liquid composition applying work simultaneously, and at the time all preparations have finished, it starts recording operation. In this case, the transfer of image data may be even for one time scanning, even for a plurality of scanning times or even for one page. The operations of the head cleaning and ink jetting check are not necessarily required. In addition, the operations of head cleaning and ink jetting check and the image data processing and transfer of image data are not necessarily sequentially performed. It is possible for the recording apparatus to perform these operations in parallel, for example, the operations of coating of the liquid composition, head cleaning and ink jetting check and the image data processing and transfer of image data are made to start at the same time. In this way, by performing these processes in parallel, it is possible to record an image without substantially decreasing the through-put of the recording apparatus even when the recording apparatus (liquid composition applying unit) performs application of the liquid composition.

<<Supplemental Description>>

In the recording method of the above-mentioned embodiment, a predetermined ink is made to adhere on a recording medium to thereby record an image. That is, the above-mentioned liquid composition is used as a pre-treatment liquid, which, however, is not limited to the above-mentioned liquid composition. In this case, an image may be recorded by using the liquid composition as a post-recording treatment liquid and making the liquid composition adhere onto a recording medium onto which a predetermined ink has been made to adhere, and an image may be recorded by using the liquid composition as a recording treatment liquid and making a predetermined ink and the liquid composition adhere onto a recording medium at the same time.

EXAMPLES

Hereinafter, examples of the present invention will be described, however, the present invention is not limited to the disclosed examples.

<<Production of Ink>>
<Production of Resin Coating Pigment Dispersion>
(Production of Resin Coating Polymer)

Into a reaction vessel, 20 parts by mass of methylethylketone, 0.03 parts by mass of a polymerization chain transfer agent (2-mercaptoethanol), and 10% by mass of each monomer shown in Table 1 (represented by parts by mass) were charged, mixed, and then subjected to a sufficient nitrogen gas substitution to thereby obtain a mixture solution. Meanwhile, in a dropping funnel, remained 90% by mass of each of the monomers shown in Table 1 (represented by parts by mass) was charged, and subsequently 0.27 parts by mass of a polymerization chain transfer agent (2-mercaptoethanol), 60 parts by mass of methylethylketone and 1.2 parts by mass of 2,2'-azobis(2,4-dimethylvaleronitrile) were added, mixed, and then subjected to a sufficient nitrogen gas substitution to thereby obtain a mixture solution.

The temperature of the mixture solution in the reaction vessel was increased to 75° C. while being stirred under a nitrogen atmosphere, and the mixture solution in the dropping funnel was gradually added dropwise to the reaction vessel in 3 hours. After completion of the dropping, the liquid temperature of the resulting mixture solution was maintained at 75° C. for 2 hours. Subsequently, a solution, in which 0.3 parts by mass of 2,2'-azobis(2,4-dimethylvaleronitrile) were dissolved in 5 parts by mass of methylethylketone, was added to the mixture solution, and the system was further aged at 75°

C. for 2 hours and at 85° C. for 2 hours to thereby obtain each solution of [Resin Coating Polymer 1] to [Resin Coating Polymer 4].

Part of the resulting resin coating polymer solution was dried at 105° C. for 2 hours under reduced pressure and isolated by removing the solvent therefrom. A weight average molecular weight of the resulting sample was measured by gel permeation chromatography, using polystyrene serving as a standard material, 60 mmol/L of phosphoric acid and 50 mmol/L of lithium bromide-containing dimethylformamide each serving as a solvent.

TABLE 1

| | | Resin-coating polymer | | | |
|---|---|---|---|---|---|
| | Monomer | 1 | 2 | 3 | 4 |
| (A) | ethoxy polyethylene glycol monomethacrylate | 10 | | | |
| | octoxy polyethylene glycol monomethacrylate | | 10 | | |
| | octoxy polyethylene glycol-polypropylene glycol monomethacrylate | | | 10 | |
| | lauroxy polyethylene glycol monomethacrylate | | | | 10 |
| (B) | methacrylic acid | 12 | 12 | 14 | 14 |
| (C) | 2-ethylhexyl acrylate | 22 | 22 | 20 | 20 |
| | styrene monomer | 46 | 46 | 46 | 46 |
| | styrene macromer | 10 | 10 | 10 | 10 |
| | Weight average molecular weight | 32,000 | 41,000 | 40,000 | 30,000 |
| | Neutralization degree | 90 | 90 | 90 | 90 |

Note that details of individual compounds shown in Table 1 are as follows:
* octoxypolyethylene glycol-polyproplylene glycol monomethacrylate: a monomer to which an oxyethylene group and a propylene group are randomly added (average number of moles added of polyethylene glycol: 4, average number of moles added of polypropylene glycol: 2)
* methacrylic acid: produced by Mitsubishi Gas Chemical Co, Inc., product name: GE-110 (MAA)
* 2-ethylhexyl methacrylate: produced by Mitsubishi Rayon Co., Ltd., product name: ACRYESTER EH
* styrene monomer: produced by Nippon Steel Chemical Co., Ltd., product name: STYRENEMONOMER
* styrene macromer: produced by TOAGOSEI Co., Ltd., product name: AS-6S (styrene macromer), number average molecular weight: 6,000

(Production of Resin Coating Pigment Dispersion)

To 77 parts by mass of a solution in which the concentration of each of the resin coating polymers obtained in the above-mentioned production example was adjusted to 50% by mass, 90 parts by mass of methylethylketone and a predetermined amount of a neutralizing agent (5N sodium hydroxide aqueous solution) were added to neutralize the methacrylic acid (neutralization degree: 90%). Subsequently 370 parts by mass of ion exchanged water were added thereto and further, 90 parts by mass of a pigment shown in Table 2 were added as a colorant thereto, and the components were dispersed and mixed, followed by 20 passes of dispersion treatment by a dispersing machine (MICROFLUIDIZER M-140K, 150 MPa). Note that the resin coating pigment dispersions using Carbon Black NIPEX 150 were subjected to 5 passes of dispersion treatment with the dispersing machine.

To the resulting water dispersion, 100 parts by mass of ion exchanged water were added, stirred, and the methylethylketone was removed therefrom at 60° C. under reduced pressure. Further, part of water was removed from the water dispersion, and then filtered through a needle-less syringe (capacity: 25 mL) [manufactured by TERUMO Corporation] to which a 5 μm-filter [acetyl cellulose film, outer diameter: 2.5 cm, produced by Fujifilm Corporation] was attached to remove coarse particles therefrom, thereby obtaining aqueous dispersions of Production Examples B-1 to B-4 (solid fraction: 25% by mass).

TABLE 2

| Production Example | Resin coating polymer | Pigment |
|---|---|---|
| B-1 | 1 | Carbon Black NIPEX150 (produced by Degussa HÜLS AG) |
| B-2 | 2 | C.I. Pigment Yellow 74 (produced by Dainichiseika Color & Chemicals Mfg. Co., Ltd.) |
| B-3 | 3 | C.I. Pigment Red 122 (produced by Dainichiseika Color & Chemicals Mfg. Co., Ltd.) |
| B-4 | 4 | C.I. Pigment Blue 15:3 (produced by Dainichiseika Color & Chemicals Mfg. Co., Ltd.) |

<Production of Pigment-Surfactant Dispersion>

Production Example C-1

Production of Black

Pigment-Surfactant Dispersion
  Carbon Black (NIPEX150, produced by Degussa HÜLS AG) . . . 15.0 parts by mass
  polyoxyethylene styrene phenylether sulfonate ammonium (anionic surfactant, produced by DAI-ICHI KOGYO SEIYAKU CO., LTD., HITENOL NF-17) . . . 6.0 parts by mass
  ion exchanged water . . . 79.0 parts by mass First, the surfactant listed above was dissolved in ion exchanged water, the carbon black was mixed therewith, and the sufficiently wetted. Then, the system was subjected to 5 passes of dispersion treatment with MICROFLUIDIZER M-140K, 150 MPa (manufactured by Mizuho Kogyo K.K.) to obtain a primary pigment dispersion. Next, to the primary pigment dispersion, 2.13 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a black pigment-surfactant dispersion. An average particle diameter ($D_{50}$) of the pigment dispersion in the resulting black pigment-surfactant dispersion was measured using a particle size distribution measurement device (manufactured by NIKKISO Co., Ltd., NANOTRACK UPA-EX150) and found to be 132 nm.

Production Example C-2

Production of Yellow

Pigment-Surfactant Dispersion
  monoazo yellow pigment (C.I. Pigment Yellow 74, produced by Dainichiseika Color & Chemicals Mfg. Co., Ltd.) . . . 20.0 parts by mass
  polyoxyethylene-β-naphthylether (nonionic surfactant, produced by TAKEMOTO OIL & FAT Co., RT-100, HLB value=18.5) . . . 7.0 parts by mass
  ion exchanged water . . . 73.0 parts by mass First, the surfactant listed above was dissolved in ion exchanged water, the pigment listed above was mixed therewith, and the sufficiently wetted. Then, the system was dispersed at 2,000 rpm for 2 hours by a wet-process dispersing machine (DYNOMILL KDL A Model, manufactured by WAB Co.) which was filled with zirconia beads having a diameter of 0.5 mm, to obtain a primary pigment dispersion.

Next, to the primary pigment dispersion, 2.84 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a yellow pigment-surfactant dispersion. An average particle diameter ($D_{50}$) of the pigment dispersion in the resulting yellow pigment-surfactant dispersion was measured using a particle size distribution measurement device (manufactured by NIKKISO Co., Ltd., NANOTRACK UPA-EX150) and found to be 76 nm.

Production Example C-3

Magenta Pigment-Surfactant Dispersion quinacridone pigment (C.I. Pigment Red 122, produced by Dainichiseika Color & Chemicals Mfg. Co., Ltd.) . . . 20.0 parts by mass
polyoxyethylene-β-naphthylether (nonionic surfactant, produced by TAKEMOTO OIL & FAT Co., RT-100, HLB value=18.5) . . . 7.0 parts by mass
ion exchanged water . . . 73.0 parts by mass First, the surfactant listed above was dissolved in ion exchanged water, the pigment listed above was mixed therewith, and the sufficiently wetted. Then, the system was dispersed at 2,000 rpm for 2 hours by a wet-process dispersing machine (DYNOMILL KDL A Model, manufactured by WAB Co.) which was filled with zirconia beads having a diameter of 0.5 mm, to obtain a primary pigment dispersion. Next, to the primary pigment dispersion, 2.84 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a magenta pigment-surfactant dispersion. An average particle diameter ($D_{50}$) of the pigment dispersion in the resulting magenta pigment-surfactant dispersion was measured using a particle size distribution measurement device (manufactured by NIKKISO Co., Ltd., NANOTRACK UPA-EX150) and found to be 86 nm.

Production Example C-4

Cyan Pigment-Surfactant Dispersion phthalocyanine pigment (C.I. Pigment Blue 15:3, produced by Dainichiseika Color & Chemicals Mfg. Co., Ltd.) . . . 20.0 parts by mass
polyoxyethylene-β-naphthylether (nonionic surfactant, produced by TAKEMOTO OIL & FAT Co., RT-100, HLB value=18.5) . . . 7.0 parts by mass
ion exchanged water . . . 73.0 parts by mass First, the surfactant listed above was dissolved in ion exchanged water, the pigment listed above was mixed therewith, and the sufficiently wetted. Then, the system was dispersed at 2,000 rpm for 2 hours by a wet-process dispersing machine (DYNOMILL KDL A Model, manufactured by WAB Co.) which was filled with zirconia beads having a diameter of 0.5 mm, to obtain a primary pigment dispersion. Next, to the primary pigment dispersion, 2.84 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a cyan pigment-surfactant dispersion. An average particle diameter ($D_{50}$) of the pigment dispersion in the resulting cyan pigment-surfactant dispersion was measured using a particle size distribution measurement device (manufactured by NIKKISO Co., Ltd., NANOTRACK UPA-EX150) and found to be 106 nm.

<Preparation of Ink>

Each inkjet ink was produced according to the following procedure. First, a water-soluble organic solvent, a penetrant, a surfactant, an antifungal agent and water shown in Tables 3-1A, 3-1B, 3-2A and 3-2B were mixed and stirred for 1 hour so as to be uniformly mixed. In addition, depending on the mixture liquid, a water-dispersible resin was added, and stirred for 1 hour. Further, the pigment dispersion, an antifoaming agent and a pH adjustor were added to the mixture liquid and stirred for 1 hour. This dispersion liquid was filtered under pressure through a polyvinylidene fluoride-membrane filter having an average pore diameter of 5.0 μm to remove coarse particles and waste therefrom, thereby producing Inks (K1 to K4, Y1 to Y4, M1 to M4, and C1 to C4).

TABLE 3-1A

| | | Ink | | | | | | | |
|---|---|---|---|---|---|---|---|---|---|
| Component (% by mass) | | K1 | Y1 | M1 | C1 | K2 | Y2 | M2 | C2 |
| Pigment dispersion | Production Ex. B-1 | 45.71 | | | | | | | |
| | Production Ex. B-2 | | 28.57 | | | | | | |
| | Production Ex. B-3 | | | 45.71 | | | | | |
| | Production Ex. B-4 | | | | 28.57 | | | | |
| | Production Ex. C-1 | | | | | 53.33 | | | |
| | Production Ex. C-2 | | | | | | 25.00 | | |
| | Production Ex. C-3 | | | | | | | 40.00 | |
| | Production Ex. C-4 | | | | | | | | 25.00 |
| Water-dispersible resin | acryl-silicone resin emulsion | | | | | 2.50 | 3.75 | 2.50 | 3.75 |
| Water-soluble organic solvent | 1,3-butanediol | | 13.00 | 18.00 | 19.00 | | 26.00 | 22.0 | 25.00 |
| | 3-methyl-1,3-butanediol | 16.00 | | | | 15.00 | | | |
| | glycerin | 16.00 | 26.00 | 18.00 | 19.00 | 15.00 | 13.00 | 11.00 | 12.50 |

TABLE 3-1B

|  | | Ink | | | | | | | |
|---|---|---|---|---|---|---|---|---|---|
| | Component (% by mass) | K1 | Y1 | M1 | C1 | K2 | Y2 | M2 | C2 |
| Penetrant | 2-ethyl-1,3-hexanediol | 2.00 | 2.00 | 2.00 | 2.00 | | | | |
| | 2,2,4-trimethyl-1,3-pentanediol | | | | | 2.00 | 2.00 | 2.00 | 2.00 |
| Anti-foaming agent | 2,4,7,9-tetramethyldecane-4,7-diol | 0.40 | | | | 0.25 | 0.25 | 0.25 | 0.25 |
| | 2,5,8,11-tetramethyldodecane-5,8-diol | | 0.40 | 0.40 | 0.40 | | | | |
| | KM-72F | | | | | | | | |
| Fluorine-based surfactant | Compound represented by (F-1)-e | 0.10 | 0.10 | 0.10 | 0.10 | | | | |
| | Compound represented by (F-2) | | | | | 0.05 | 0.05 | 0.05 | 0.05 |
| | Compound represented by (F-3-1) | | | | | | | | |
| | Compound represented by (F-4-1) | | | | | | | | |
| Antifungal agent | PROXEL GXL | 0.05 | 0.05 | 0.05 | 0.05 | 0.05 | 0.05 | 0.05 | 0.05 |
| pH adjuster | 2-amino-2-ethyl-1,3-propanediol | 0.30 | 0.40 | 0.40 | 0.40 | 0.60 | 0.30 | 0.30 | 0.30 |
| Pure water | | balance | balance | balance | balance | balance | balance | balance | balance |
| Total (% by mass) | | 100 | 100 | 100 | 100 | 100 | 100 | 100 | 100 |

TABLE 3-2A

| | | Ink | | | | | | | |
|---|---|---|---|---|---|---|---|---|---|
| | Component (% by mass) | K3 | Y3 | M3 | C3 | K4 | Y4 | M4 | C4 |
| Pigment dispersion | Production Ex. B-1 | | | | | 22.86 | | | |
| | Production Ex. B-2 | | | | | | 5.71 | | |
| | Production Ex. B-3 | | | | | | | 9.14 | |
| | Production Ex. B-4 | | | | | | | | 5.71 |
| | Production Ex. C-1 | | | | | 26.67 | | | |
| | Production Ex. C-2 | | | | | | 20.00 | | |
| | Production Ex. C-3 | | | | | | | 32.00 | 20.00 |
| | Production Ex. C-4 | | | | | | | | |
| | Black self-dispersible pigment dispersion (CAB-O-JET300) | 53.33 | | | | | | | |
| | Yellow self-dispersible pigment dispersion (CAB-O-JET270) | | 45.45 | | | | | | |
| | Magenta self-dispersible pigment dispersion (CAB-O-JET260) | | | 54.55 | | | | | |
| | Cyan self-dispersible pigment dispersion (CAB-O-JET250) | | | | 45.45 | | | | |
| Water-soluble organic solvent | 1,3-butanediol | | 27.50 | 26.00 | 27.60 | | 25.00 | 22.00 | 24.00 |
| | 3-methyl-1,3-butanediol | 16.50 | | | | 15.50 | | | |
| | glycerin | 16.50 | 13.75 | 13.00 | 13.80 | 15.50 | 12.50 | 11.00 | 12.00 |

TABLE 3-2B

| | | Ink | | | | | | | |
|---|---|---|---|---|---|---|---|---|---|
| | Component (% by mass) | K3 | Y3 | M3 | C3 | K4 | Y4 | M4 | C4 |
| Penetrant | 2-ethyl-1,3-hexanediol | 2.00 | 2.00 | 2.00 | 2.00 | 2.00 | 2.00 | 2.00 | 2.00 |
| | 2,2,4-trimethyl-1,3-pentanediol | | | | | | | | |
| Anti-foaming agent | 2,4,7,9-tetramethyldecane-4,7-diol | | | | | 0.25 | 0.25 | 0.25 | 0.25 |
| | 2,5,8,11-tetramethyldodecane-5,8-diol | | | | | | | | |
| | KM-72F | 0.10 | 0.10 | 0.10 | 0.10 | | | | |
| Fluorine-based surfactant | Compound represented by (F-1)-e | | | | | 0.05 | 0.05 | 0.05 | 0.05 |
| | Compound represented by (F-2) | | | | | | | | |
| | Compound represented by (F-3-1) | 0.05 | | | | | | | |
| | Compound represented by (F-4-1) | | 0.05 | 0.05 | 0.05 | | | | |
| Antifungal agent | PROXEL GXL | 0.05 | 0.05 | 0.05 | 0.05 | 0.05 | 0.05 | 0.05 | 0.05 |

TABLE 3-2B-continued

|  | | Ink | | | | | | | |
|---|---|---|---|---|---|---|---|---|---|
| Component (% by mass) | | K3 | Y3 | M3 | C3 | K4 | Y4 | M4 | C4 |
| pH adjuster | 2-amino-2-ethyl-1,3-propanediol | 0.60 | 0.30 | 0.30 | 0.30 | 1.20 | 0.30 | 0.30 | 0.30 |
| Pure water | | balance | balance | balance | balance | balance | balance | balance | balance |
| Total (% by mass) | | 100 | 100 | 100 | 100 | 100 | 100 | 100 | 100 |

Abbreviations in Tables 3-1A, 3-1B, 3-2A and 3-2B represent the following meaning:
* CAB-O-JET 260: produced by CABOT Co., pigment solid fraction: 11% by mass, self-dispersible magenta pigment
* CAB-O-JET 250: produced by CABOT Co., pigment solid fraction: 11% by mass, self-dispersible cyan pigment
* CAB-O-JET 270: produced by CABOT Co., pigment solid fraction: 11% by mass, self-dispersible yellow pigment
* CAB-O-JET 300: produced by CABOT Co., pigment solid fraction: 15% by mass, self-dispersible black pigment
* acryl-silicone resin emulsion: produced by Showa High Polymer Co., Ltd., POLYZOLE ROY6312, solid fraction: 40% by mass, average particle diameter: 171 nm, minimum film-forming temperature (MFT): 20° C.
* PROXEL GXL: PROXEL GXL: antifungal agent mainly containing 1,2-benzisothiazolin-3-one (produced by Avicia Co., component: 20% by mass, containing dipropylene glycol)
* KM-72F: self-emulsified type silicone anti-foaming agent (produced by Shin-Etsu silicone Corp., component: 100% by mass)

Next, each of the inks produced as above was evaluated according to the following evaluation methods. The evaluation results are shown in Table 4.

Average particle diameter ($D_{50}$): measured at 25° C. by a particle size distribution measurement device (NANOTRACK UPA-EX150, manufactured by NIKKISO Co., Ltd.)

Viscosity: measured at 25° C. by a viscometer (RE-550L, manufactured by TOKI SANGYO Co., Ltd.)

Surface tension: measured at 25° C. by an automatic surface tension meter (CBVP-Z, manufactured by Kyowa Interface Science Co., LTD.)

TABLE 4

| | Physical Properties of Ink | | |
|---|---|---|---|
| | Average particle diameter $D_{50}$ (nm) | Viscosity (mPa · s) | Surface tension (mN/m) |
| K1 | 79.5 | 8.10 | 21.5 |
| Y1 | 95.6 | 7.98 | 21.0 |
| M1 | 95.9 | 8.03 | 21.3 |
| C1 | 81.3 | 8.00 | 20.9 |
| K2 | 133.3 | 8.08 | 22.4 |
| Y2 | 82.4 | 8.00 | 21.7 |
| M2 | 92.6 | 8.09 | 21.6 |
| C2 | 108.6 | 8.14 | 21.6 |
| K3 | 110.4 | 6.25 | 24.9 |
| Y3 | 92.8 | 6.12 | 25.1 |
| M3 | 135.2 | 6.41 | 25.0 |
| C3 | 130.1 | 6.26 | 25.2 |
| K4 | 124.1 | 7.92 | 24.5 |
| Y4 | 84.1 | 7.85 | 23.5 |
| M4 | 94.5 | 7.88 | 24.7 |
| C4 | 98.8 | 7.89 | 24.7 |

<<Production of Liquid Composition>>
<Production of Cationic Polymer>

Production Example A-1

Copolymer of N,N-dimethylallylamine Hydrochloride and N-methyldiallylamine Hydrochloride (Charged Molar Ratio: 0.7:0.3)

Into a 1 L-separable flask reaction vessel equipped with a stirrer, a thermometer and a reflux condenser, a 71.66% by mass N,N-dimethylallylamine hydrochloride aqueous solution (237.58 g (1.4 mol)) and a 60.17% by mass N-methyldiallylamine hydrochloride aqueous solution (147.23 g (0.6 mol)) were added to obtain an aqueous solution of having a monomer concentration of 67.27% by mass. This aqueous solution was heated to 60°. After the temperature of the aqueous solution was constant, ammonium persulfate (4.56 g (1.0 mol % relative to monomer)) was added as a radical polymerization initiator to the aqueous solution to initiate polymerization. Also, 2 hours later, and 4 hours later of the initiation of polymerization, ammonium persulfate (4.56 g (1.0 mol % relative to monomer)) was added to the reaction system for each time. Furthermore, 23 hours later, 24 hours later, 25 hours later, 26 hours later, 27 hours later and 28 hours later of the initiation of polymerization, ammonium persulfate (9.13 g (2.0 mol % relative to monomer)) was added to the reaction system for each time. Thereafter, the polymerization reaction was further continued for 3 hours to thereby obtain a brown solution (Production Example A-1) of a copolymer of N,N-dimethylallylamine hydrochloride and N-methyldiallylamine hydrochloride (charged molar ratio: 0.7:0.3). A weight average molecular weight of the copolymer determined by GPC (Gel Permeation Chromatography) was 1,800.

Production Example A-2

Copolymer of N,N-dimethylallylamine Hydrochloride and N-methyldiallylamine Hydrochloride (Charged Molar Ratio: 0.9:0.1)

Into a reaction vessel (the same type as used in Production Example A-1), a 61.54% by mass N,N-dimethylallylamine hydrochloride aqueous solution (533.56 g (2.7 mol)) and a 60.17% by mass N-methyldiallylamine hydrochloride aqueous solution (73.62 g (0.3 mol)) were added to obtain an aqueous solution of having a monomer concentration of 61.37% by mass. This aqueous solution was heated to 60°. After the temperature of the aqueous solution was constant, ammonium persulfate (6.85 g (1.0 mol % relative to monomer)) was added as a radical polymerization initiator to the aqueous solution to initiate polymerization. Also, 2 hours later, and 4 hours later of the initiation of polymerization, ammonium persulfate (6.85 g (1.0 mol % relative to monomer)) was added to the reaction system for each time. Furthermore, 23 hours later, 24 hours later, 25 hours later, 26 hours later, 27 hours later, 47 hours later and 48 hours later of the initiation of polymerization, ammonium persulfate (13.69 g (2.0 mol % relative to monomer)) was added to the reaction system for each time. Thereafter, the polymerization reaction was further continued for 2 hours to thereby obtain a brown solution (Production Example A-2) of a copolymer of N,N-dimethylallylamine hydrochloride and N-methyldiallylamine hydrochloride (charged molar ratio: 0.9:0.1). A weight average molecular weight of the copolymer determined by GPC (Gel Permeation Chromatography) was 700.

Production Example A-3

Copolymer of Monoallylamine Hydrochloride and N,N-dimethylallylamine Hydrochloride (Charged Molar Ratio: 0.5:0.5)

Into a 300 ml-three-necked flask equipped with a stirrer, a thermometer, and a reflux condenser, a 72.11% by mass monoallylamine hydrochloride aqueous solution (64.87 g (0.50 mol)) and a 60.21% by mass N,N-dimethylallylamine hydrochloride aqueous solution (100.99 g (0.50 mol) were charged, and water (13.45 g) was added to obtain an aqueous solution having a monomer concentration of 60% by mass. This aqueous solution was heated to 60° C. After the temperature of the aqueous solution was constant, 2,2-azobis(2-amidinopropane)dihydrochloride (8.68 g (3.2 mol % relative to monomer)) was added as a radical polymerization initiator to the aqueous solution to initiate polymerization. Also, 24 hours later, 48 hours later and 72 hours later of the initiation of polymerization, 2,2-azobis(2-amidinopropane)dihydrochloride (8.68 g) was added to the reaction system for each time. Thereafter, the polymerization reaction was further continued for 24 hours to obtain a light yellow reaction solution. Thereafter, the resulting light yellow reaction solution was poured into 3 litters of acetone-isopropanol mixture solvent (mass ratio: 1:1) to reprecipitate the copolymer, filtered through a glass filter, and then sufficiently washed, followed by vacuum drying at 60° C. for 48 hours to thereby obtain a brown solution (Production Example A-3) of a copolymer of monoallylamine hydrochloride and N,N-dimethylallylamine hydrochloride (charged molar ratio: 0.5:0.5). A weight average molecular weight of the copolymer determined by GPC (Gel Permeation Chromatography) was 800.

Production Example A-4

Diallyldimethylamine Hydrochloride-sulfur Dioxide Copolymer

Into a 300 ml-four-necked flask equipped with a stirrer, a thermometer, and a reflux condenser, a 1 mol/L diallyldimethylamine hydrochloride/diemthylsulfoxide (100 ml) and a 1 mol/L sulfur dioxide/diemthylsulfoxide solution (100 ml) were added and mixed, and azobis-isobutylonitrile (0.82 g) was added as a polymerization initiator to the mixture, followed by polymerizing at 40° C. for 24 hours. The reaction solution was added dropwise to methanol to precipitate the copolymer, filtered through a glass filter, followed by drying under reduced pressure, thereby obtaining 18 g of a copolymerized polymer (Production Example A-4). A weight average molecular weight of the copolymer determined by GPC (Gel Permeation Chromatography) (polyethylene glycol used as a standard) was about 3,000. The repeating unit of this polymer is represented by Formula (6) below.

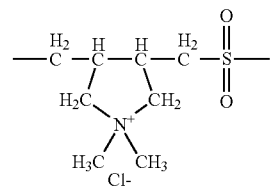

Formula (6)

Production Example A-5

Diallyldimethyl Ammonium Chloride-acrylamide Copolymer

Into a 500 ml-four-necked flask equipped with a stirrer, a thermometer, and a reflux condenser, a 60% by mass diallyldimethyl ammonium chloride aqueous solution (134.7 g (0.5 mol)) and distilled water (176 g) were charged, and the pH of the mixture was adjusted with chloride to 3 to 4. Next, acrylamine (18.3 g (0.25 mol)) and sodium hypophosphite (3.9 g) were added thereto, and stirred at 50° C. to be dissolved. Next, the internal temperature of the system was increased to 60° C., and a 28.5% by mass ammonium persulfate aqueous solution (1.7 g) was added thereto. Four hours later, the ammonium persulfate aqueous solution (3.5 g) was further added while the internal temperature of the system being maintained at 60° C. to 65° C. Thereafter, the reaction system was reacted at 60° C. for 20 hours to thereby obtain a diallyldimethyl ammonium chloride-acrylamide copolymer (Production Example A-5). A weight average molecular weight of the copolymer was determined by GPC (Gel Permeation Chromatography) and found to be 3,000.

<Production of Liquid Composition>

Each liquid composition was produced according to the following procedure. First, materials shown in Tables 5A and 5B were mixed, and stirred so as to be uniformly mixed, thereby obtaining a pretreatment liquid. This pretreatment liquid was filtered under pressure through a polyvinylidene fluoride membrane having an average pore diameter of 5.0 μm to remove coarse particles and waste to thereby produce Liquid Compositions 1 to 11. Physical properties of Liquid Compositions 1 to 11 are shown in Table 6. The measurement of a surface tension of the liquid compositions was performed in a similar manner to that of the surface tension of ink. As for coating properties of each liquid composition, the liquid composition was applied to a recording medium by a roll coater, and evaluated by visual observation based on the following criteria.

[Evaluation Criteria]

A: No problem (no foaming and no uneven coating observed)

B: Slightly problematic (foaming and uneven coating slightly observed)

TABLE 5A

| | | Liquid Composition | | | | |
|---|---|---|---|---|---|---|
| Component (% by mass) | | 1 | 2 | 3 | 4 | 5 |
| Organic acid ammonium | lactic acid ammonium (content: 75%) | 13.33 | 6.67 | | | 6.67 |
| | lactic acid ammonium (content: 97%) | | | 10.31 | | |
| | tartaric acid (content: 98%) | | | | 10.20 | |

TABLE 5A-continued

| | | Liquid Composition | | | | |
|---|---|---|---|---|---|---|
| | Component (% by mass) | 1 | 2 | 3 | 4 | 5 |
| Inorganic metal salt compound | calcium nitrate | | | | | |
| Cationic polymer | A-1 | | 20.00 | | | |
| | A-2 | | | | | |
| | A-3 | | | | | |
| | A-4 | | | | | 20.00 |
| | A-5 | | | | | |
| | SHAROL DC-902P | | | | | |
| Water-soluble organic solvent | 3-methyl-1,3-butanediol | 10.00 | 10.00 | 10.00 | 10.00 | 10.00 |
| | glycerin | 20.00 | 20.00 | 20.00 | 20.00 | 20.00 |
| Penetrant | 2-ethyl-1,3-hexanediol | 1.00 | 1.00 | 1.00 | 1.00 | 1.00 |
| Anti-foaming agent | 2,4,7,9-tetramethyldecane-4,7-diol | 0.10 | 0.10 | 0.10 | 0.10 | |
| | 2,5,8,11-tetramethyldodecane-5,8-diol | | | | | 0.10 |
| Fluorine-based surfactant | Compound represented by (F-1)-e | 0.20 | | 0.20 | 0.20 | |
| | Compound represented by (F-2) | | 0.20 | | | 0.30 |
| | Compound represented by (F-3-1) | | | | | |
| | Compound represented by (F-4-1) | | | | | |
| Surfactant | SOFTANOL EP7025 | | | | | |
| Anti-fungal agent | PROXEL GXL | 0.05 | 0.05 | 0.05 | 0.05 | 0.05 |
| Anti-corrosive agent | 1,2,3-benzotriazole | 0.05 | 0.05 | 0.05 | 0.05 | 0.05 |
| Pure water | | *1 | *1 | *1 | *1 | *1 |
| Total (% by mass) | | 100 | 100 | 100 | 100 | 100 |

*1: balance

TABLE 5B

| | | Liquid composition | | | | | |
|---|---|---|---|---|---|---|---|
| | Component (% by mass) | 6 | 7 | 8 | 9 | 10 | 11 |
| Organic acid ammonium | lactic acid ammonium (content: 75%) | 6.67 | 6.67 | 13.33 | 6.67 | | 6.67 |
| | lactic acid ammonium (content: 97%) | | | | | | |
| | tartaric acid (content: 98%) | | | | | | |
| Inorganic metal salt compound | calcium nitrate | | | | | 20.41 | |
| Cationic polymer | A-1 | | | | | | 20.00 |
| | A-2 | | | | 6.61 | | |
| | A-3 | | | | | | |
| | A-4 | | | | | | |
| | A-5 | 20.00 | | | | | |
| | SHAROL DC-902P | | 19.23 | 19.23 | 19.23 | | |
| Water-soluble organic solvent | 3-methyl-1,3-butanediol | 20.00 | 15.00 | 15.00 | 15.00 | 15.00 | 10.00 |
| | glycerin | 15.00 | 20.00 | 20.00 | 20.00 | 15.00 | 20.00 |
| Penetrant | 2-ethyl-1,3-hexanediol | 1.00 | 1.00 | 1.00 | 1.00 | | 1.00 |
| Anti-foaming agent | 2,4,7,9-tetramethyldecane-4,7-diol | | 0.10 | 0.10 | | | |
| | 2,5,8,11-tetramethyldodecane-5,8-diol | 0.10 | | | | | |
| Fluorine-based surfactant | Compound represented by (F-1)-e | 0.20 | 0.20 | 0.20 | | | |
| | Compound represented by (F-2) | | | | | | 0.20 |
| | Compound represented by (F-3-1) | | | | | | |
| | Compound represented by (F-4-1) | | | | | | |
| Surfactant | SOFTANOL EP7025 | | | | 0.50 | 0.50 | |
| Anti-fungal agent | PROXEL GXL | 0.05 | 0.05 | 0.05 | 0.05 | 0.05 | 0.05 |

TABLE 5B-continued

|  | | Liquid composition | | | | | |
|---|---|---|---|---|---|---|---|
| Component (% by mass) | | 6 | 7 | 8 | 9 | 10 | 11 |
| Anti-corrosive agent | 1,2,3-benzotriazole | 0.05 | 0.05 | 0.05 | 0.05 | 0.05 | 0.05 |
| Pure water | | *1 | *1 | *1 | *1 | *1 | *1 |
| Total (% by mass) | | 100 | 100 | 100 | 100 | 100 | 100 |

*1: balance
Abbreviations in Tables 5A and 5B represent the following meaning:
* lactic acid ammonium: produced by Kanto Chemical Co., Inc., purity: 99.5% or more
* lactic acid ammonium: produced by Kanto Chemical Co., Inc., purity: 99.5% or more
* tartaric acid ammonium: produced by Kanto Chemical Co., Inc., purity: 99.5% or more
* SHAROL DC-902P: polydimethyl diallyl ammonium chloride (produced by DAI-ICHI KOGYO SEIYAKU CO., LTD., effective component: 52% by mass, average molecular weight: 9,000)
* ZONYL FS-300: polyoxyethylene perfluoroalkylether (produced by Dupont, effective component: 40% by mass)
* KF-643: polyether-modified silicone-based surfactant (produced by Shin-Etsu Chemical Co., Ltd., effective component: 100% by mass)
* SOFTANOL EP-7025: polyoxyalkylene alkylether (produced by Nippon Shokubai Co., Ltd., component: 100% by mass)
* FTERGENT 251: branched perfluoroalkenyl group-containing fluorine-based surfactant (produced by Neos Co., Ltd., effective component: 100% by mass)
* PROXEL GXL: antifungal agent mainly containing 1,2-benzisothiazolin-3-one (produced by Avicia Co., component: 20% by mass, containing dipropylene glycol)

TABLE 6

| Liquid composition | pH | Surface tension (mN/m) | Coating properties |
|---|---|---|---|
| 1 | 6.17 | 20.6 | A |
| 2 | 5.92 | 20.8 | A |
| 3 | 6.57 | 21.1 | A |
| 4 | 6.41 | 20.9 | A |
| 5 | 6.26 | 20.7 | A |
| 6 | 6.14 | 21.6 | A |
| 7 | 6.19 | 20.3 | A |
| 8 | 6.29 | 20.9 | A |
| 9 | 6.50 | 30.8 | B |
| 10 | 6.82 | 31.3 | B |
| 11 | 5.95 | 21.0 | B |

<<Step of Making Liquid Composition Adhere onto Recording Medium>>

In each Examples and Comparative Examples excluding Comparative Examples 1 to 4, a liquid composition described in Table 7 was made to adhere onto a recording medium (RECYCLE PPC: produced by Daio Paper Corporation (recycled paper), basis weight: 66.5 g/m², recycled waste pulp-mixed rate: 70% or more, sizing degree: 17 sec, air permeability: 35 sec). In this case, each of Liquid Compositions 1 to 10 was applied, in an adhesion amount of 0.8 g/m², to the recording medium by a roll coating method, using the recording apparatus illustrated in FIG. 2 or FIG. 3, and then naturally dried.

<<Step of Making Ink Adhere onto Recording Medium>>

In the step of making an ink adhere onto a recording medium, concerning each Examples and Comparative Examples, using an inkjet recording apparatus (IPSIO GX5000, manufactured by Ricoh Company Ltd.) to which an ink set described in Table 7 had been mounted, an image was recorded by applying an ink onto the recording medium shown in Table 7 which had been produced by the step of making a liquid composition onto the recording medium, and thereby an image was recorded. Concerning Comparative Examples 1 to 4, each ink was applied to a recording medium (RECYCLE PPC) on which surface no liquid composition was applied, and thereby an image was recorded. Since images recorded differ for every evaluation item, and thus the details of the images used will be described in the paragraph "Recorded Matter". Note that at the time of applying an ink to the recording medium, the driving voltage of a piezoelectric element was varied so that the discharge amounts of the individual inks were equal to each other, under the environment of 23° C.±0.5° C. and 50% RH±5% RH. In addition, the printing mode when each ink was applied was set to "Regular Paper/Clear Mode, Color Matching: OFF".

TABLE 7

|  | Liquid composition | Ink set |
|---|---|---|
| Ex. 1 | 1 | 1 |
| Ex. 2 | 2 | 2 |
| Ex. 3 | 2 | 3 |
| Ex. 4 | 2 | 4 |
| Ex. 5 | 5 | 1 |
| Ex. 6 | 6 | 1 |
| Ex. 7 | 7 | 4 |
| Ex. 8 | 8 | 4 |
| Ex. 9 | 9 | 4 |
| Ex. 10 | 7 | 1 |
| Ex. 11 | 7 | 2 |
| Ex. 12 | 7 | 3 |
| Ex. 13 | 11 | 2 |
| Comp. Ex. 1 |  | 1 |
| Comp. Ex. 2 |  | 2 |
| Comp. Ex. 3 |  | 3 |
| Comp. Ex. 4 |  | 4 |
| Comp. Ex. 5 | 10 | 4 |
| Comp. Ex. 6 | 3 | 1 |
| Comp. Ex. 7 | 4 | 1 |

Note that, each of the ink sets shown in Table 7 is composed of the inks described below.
* Ink Set 1: Ink M1, Ink C1, Ink Y1, Ink K1
* Ink Set 2: Ink M2, Ink C2, Ink Y2, Ink K2
* Ink Set 3: Ink M3, Ink C3, Ink Y3, Ink K3
* Ink Set 4: Ink M4, Ink C4, Ink Y4, Ink K4

<<Evaluation of Recorded Matter>>

Recording matters obtained using Examples and Comparative Examples were evaluated for the following items.

<Density>

Concerning a recorded matter which was recorded by means of MICROSOFT (registered) Word 2000, in which a character "■" was recorded (font size: 64 point), the density of the "■" portion on a recorded surface was measured by an X-Rite 938, and evaluated based on the following criteria.

[Evaluation Criteria]
   A: Black: 1.45 or higher,
   Yellow: 0.90 or higher,
   Magenta: 1.15 or higher,
   Cyan: 1.20 or higher
   B: Black: 1.35 or higher but lower than 1.45,
   Yellow: 0.85 or higher but lower than 0.90,
   Magenta: 1.05 or higher but lower than 1.15,
   Cyan: 1.10 or higher but lower than 1.20
   C: Black: lower than 1.35,
   Yellow: lower than 0.85,
   Magenta: lower than 1.05,
   Cyan: lower than 1.10
<Strikethrough>

A recorded matter which was recorded by means of MICROSOFT (registered) Word 2000, in which a character "■"was recorded (font size: 64 point), was measured for colorimetry at its rear surface to the recorded surface where "■"was recorded, by an X-Rite 938. A density obtained by subtracting the density of the background of the recording medium was regarded as "strikethrough density". The measured strikethrough density was graded based on the following criteria.

[Evaluation Criteria]
   A: Black: lower than 0.09,
   Yellow: lower than 0.08,
   Magenta: lower than 0.09,
   Cyan: lower than 0.09,
   B: Black: 0.09 or higher but lower than 0.10,
   Yellow: 0.08 or higher but lower than 0.09,
   Magenta: 0.09 or higher but lower than 0.10,
   Cyan: 0.09 or higher but lower than 0.10,
   C: Black: 0.10 or higher,
   Yellow: 0.09 or higher,
   Magenta: 0.10 or higher,
   Cyan: 0.10 or higher
<Color Bleeding>

Concerning a recorded matter on which surface 0.5-mm line images for each color of magenta, cyan and black were recorded on a yellow solid image, occurrence of bleeding at color boundary where different color inks were recorded was visually observed. Similarly to the above, a recorded matter on which surface 0.5-mm line images for each color of magenta, yellow and black were recorded on a cyan solid image, and a recorded matter on which surface 0.5-mm line images for each color of cyan, yellow and black were recorded on a magenta solid image were also visually observed for presence or absence of bleeding at color boundary.

[Evaluation Criteria]
   A: No problem at all
   B: Slightly occurred but no problem
   C: Occurred
   D: Problematic
<Feathering>

Concerning a recorded matter which was recorded by means of MICROSOFT (registered) Word 2000, in which a black character was recorded (font size: 6 point), occurrence of feathering at the following character portion was visually observed. 轟

[Evaluation Criteria]
   A: No problem at all
   B: Slightly occurred but no problem
   C: Occurred in small percentage, problematic
   D: Occurred, problematic
<White Spot>

Concerning a recorded matter which was recorded by means of MICROSOFT (registered) Word 2000, in which a character "■"was recorded in each color of yellow, magenta, cyan, and black (font size: 64 point), the "■" portion was visually observed, and presence or absence of white spots (void portions in the character "■") was evaluated.

[Evaluation Criteria]
   A: No problem at all
   B: Slightly observed, but no problem
   C: Observed, but within an allowable range
   D: Problematic
<Fixability>

A recorded matter which was recorded by means of MICROSOFT (registered) Word 2000, in which a monochrome black solid image (3 cm×3 cm) was recorded, was dried at 23° C. ±1° C. and 50% RH±10% RH for 24 hours. Subsequently, JIS L 0803 Cotton No. 3 that had been attached to a CM-1 model clockmeter with a double-sided tape was moved to-and-fro on the recorded matter 5 times so that it was applied to the monochrome black solid image in the recorded matter, and then the density of the cotton cloth to which the ink had been attached was measured by an X-Rite 938. The density of the background color of the cotton cloth was subtracted from the measured density value, and the result was regarded as a density of smeared portions. The density of the smeared portions was graded based on the following evaluation criteria.

[Evaluation Criteria]
   A: lower than 0.15
   B: 0.15 or higher but lower than 0.25
   C: 0.25 or higher
<Drying Properties>

A recorded matter which was recorded by means of MICROSOFT (registered) Word 2000, in which a monochrome black solid image (3 cm×3 cm) was produced. Subsequently, immediately after the recording of the image (10 minutes later), JIS L 0803 Cotton No. 3 that had been attached to a CM-1 model clockmeter with a double-sided tape was moved to-and-fro on the recorded matter 5 times so that it was applied to the monochrome black solid image in the recorded matter, and then the density of the cotton cloth to which the ink had been attached was measured by an X-Rite 938. The density of the background color of the cotton cloth was subtracted from the measured density value, and the result was regarded as a density of smeared portions. The density of the smeared portions was graded based on the following evaluation criteria. Note that the evaluation was performed under the environment of 23° C.±1° C. and 50% RH±10% RH.

[Evaluation Criteria]
   A: lower than 0.2
   B: 0.2 or higher but lower than 0.3
   C: 0.3 or higher The evaluation results are shown in Table 8. The inks were evaluated for each color based on the evaluation criteria described above. Note that as for the results of image quality of recorded matters, the most common evaluation grade was described as the result. When the number of evaluation grades was equal, the better grade was described as the result.

TABLE 8

| | Image density | Strikethrough | Feathering | Color bleeding | White spot | Abrasion resistance | Drying properties |
|---|---|---|---|---|---|---|---|
| Ex. 1 | B | A | A | A | B | A | A |
| Ex. 2 | A | B | B | A | A | A | A |
| Ex. 3 | A | A | A | A | A | A | A |
| Ex. 4 | A | B | A | A | A | A | A |
| Ex. 5 | A | A | A | A | A | B | B |

TABLE 8-continued

| | Image density | Strike-through | Feathering | Color bleeding | White spot | Abrasion resistance | Drying properties |
|---|---|---|---|---|---|---|---|
| Ex. 6 | A | A | A | A | A | B | B |
| Ex. 7 | A | A | A | A | A | A | A |
| Ex. 8 | A | A | A | A | A | A | A |
| Ex. 9 | A | A | A | A | A | B | B |
| Ex. 10 | A | A | A | A | A | A | A |
| Ex. 11 | A | B | B | A | A | A | A |
| Ex. 12 | A | A | B | A | A | A | A |
| Ex. 13 | A | B | B | A | A | A | A |
| Comp. Ex. 1 | C | C | B | B | B | B | B |
| Comp. Ex. 2 | C | C | C | D | C | A | A |
| Comp. Ex. 3 | C | C | C | D | C | A | A |
| Comp. Ex. 4 | C | C | C | D | C | A | A |
| Comp. Ex. 5 | A | A | A | A | A | C | C |
| Comp. Ex. 6 | C | C | C | B | C | A | A |
| Comp. Ex. 7 | C | C | C | B | C | A | A |

REFERENCE SIGNS LIST 1 liquid composition
2 film thickness control roller
3 pump-up roller
4 applying roller
5 counter roller
6 recording medium
7 paper feeding roller
8 paper feeding tray
10 paper feed roller
11 recording medium feed roller
12 recording medium feed roller
13 recording medium feed roller
14 recording medium feed roller
15 recording medium feed roller
16 recording medium feed roller
17 recording medium
18 paper feeding roller
20 recording head
21 ink cartridge
22 carriage shaft
23 carriage
31 recording medium guide
32 recording medium feed roller
33 recording medium feed roller
34 recording medium send-back roller
35 paper feed guide
101 recording medium
102 liquid composition-attached portion
103 ink-attached portion
104 colorant

The invention claimed is:

1. A liquid composition comprising:
an organic acid ammonium salt of Formula (1),
a water-soluble polymer having a cationic functional group, and
water,

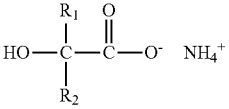

Formula (1)

where $R_1$ is a hydroxyl group, a methyl group or a hydrogen atom; and $R_2$ is a hydroxyl group or a methyl group
wherein the liquid composition is suitable for agglutinating particles having a negative charge which are dispersed in a dispersion liquid.

2. The liquid composition of claim 1, wherein the organic acid ammonium salt is ammonium lactate.

3. The liquid composition of claim 1, wherein the water-soluble polymer having a cationic functional group is a polyamine compound or a polyamide compound.

4. The liquid composition of claim 1, wherein the water-soluble polymer having a cationic functional group comprises at least one structural unit selected from the group consisting of an N,N-dialkylallylamine of Formula (C-1), an addition salt of an N,N-dialkylallylamine of Formula (C-1), a diallylamine of Formula (C-2), an addition salt of a diallylamine of Formula (C-2), a diallylamine of Formula (C-3), and an addition salt of a diallylamine of Formula (C-3),

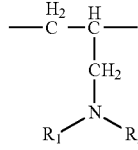

Formula (C-1)

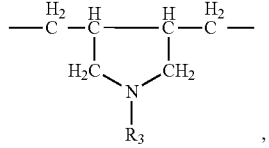

Formula (C-2)

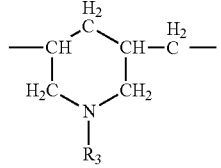

Formula (C-3)

wherein $R_1$ and $R_2$ in Formula (C-1) are each independently an alkyl group having 1 to 4 carbon atoms, and $R_3$ in Formulae (C-2) and (C-3) is a hydrogen atom or an alkyl group having 1 to 3 carbon atoms.

5. The liquid composition of claim 1, wherein the water-soluble polymer having a cationic functional group comprises at least one structural unit selected from the group consisting of an addition salt of an N,N-dialkylallylamine of Formula (C-4), an addition salt of an N,N-dialkylallylamine of Formula (C-5), a polyamide of Formula (C-6), and a polyallylamine of Formula (C-7),

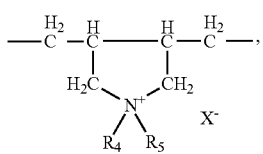
Formula (C-4)

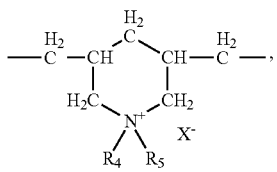
Formula (C-5)

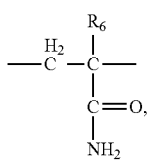
Formula (C-6)

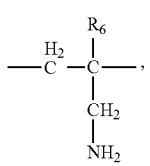
Formula (C-7)

wherein
$R_4$ and $R_5$ are each independently an alkyl group having 1 to 4 carbon atoms,
$X^-$ is a counter ion selected from the group consisting of $Cl^-$, $Br^-$ and $I^-$, and
$R_6$ is a hydrogen atom or a methyl group.

6. The liquid composition of claim 5, wherein the water-soluble polymer having a cationic functional group has a weight-average molecular weight of 2000 to 15,000.

7. The liquid composition of claim 1, further comprising:
a fluorine-based surfactant, and
a compound of Formula (2), $$HOR_1R_3C\text{—}[CH_2]_n\text{—}CR_2R_4OH \qquad \text{Formula (2)}$$

where $R_1$ and $R_2$ each independently are an alkyl group having 3 to 6 carbon atoms; $R_3$ and $R_4$ each independently are an alkyl group having 1 to 2 carbon atoms; and n is an integer of 1 to 6.

8. The liquid composition of claim 7, comprising 0.01 to 10 mass % of the compound of Formula (2).

9. The liquid composition of claim 7, wherein the compound of Formula (2) is 2,4,7,9-tetramethyldecane-4,7-diol or 2,5,8,11-tetramethyldodecane-5,8-diol.

10. The liquid composition of claim 1, comprising 1 to 40 mass % of the organic acid ammonium salt, based on a mass of the liquid composition.

11. The liquid composition of claim 1, comprising 3 to 30 mass % of the organic acid ammonium salt, based on a mass of the liquid composition.

12. The liquid composition of claim 1, wherein the water-soluble polymer having a cationic functional group has a weight-average molecular weight of 250 to 3000 in a free state.

13. The liquid composition of claim 1, wherein the ignition residue of the water-soluble polymer having a cationic functional group is 5 mass % or less.

14. The liquid composition of claim 1, wherein the ignition residue of the water-soluble polymer having a cationic functional group is 2 mass % or less.

15. The liquid composition of claim 1, wherein the ignition residue of the water-soluble polymer having a cationic functional group is 0.5 mass % or less.

16. The liquid composition of claim 1, having a surface tension of 30 my/m or lower.

17. A recording method comprising:
adhering a liquid composition onto a recording medium, and
adhering an ink onto the recording medium,
wherein the ink is a dispersion liquid comprising water and particles, wherein the particles comprise a colorant and have a negative charge and
wherein the liquid composition comprises:
an organic acid ammonium salt of Formula (1),
a water-soluble polymer having a cationic functional group, and
water,

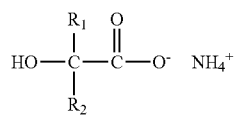
Formula (1)

where $R_1$ is a hydroxyl group, a methyl group or a hydrogen atom; and $R_2$ is a hydroxyl group or a methyl group
wherein the liquid composition is suitable for agglutinating particles having a negative charge which are dispersed in a dispersion liquid.

18. The recording method of claim 17, wherein the colorant is at least one selected from the group consisting of a self-dispersible pigment, a pigment coated with a resin, and a pigment dispersed by a dispersant.

* * * * *